United States Patent
Deng et al.

(10) Patent No.: US 10,170,762 B2
(45) Date of Patent: Jan. 1, 2019

(54) LITHIUM METAL OXIDES WITH MULTIPLE PHASES AND STABLE HIGH ENERGY ELECTROCHEMICAL CYCLING

(71) Applicant: Envia Systems, Inc., Newark, CA (US)

(72) Inventors: Haixia Deng, Fremont, CA (US); Subramanian Venkatachalam, Pleasanton, CA (US); Sujeet Kumar, Newark, CA (US); Herman A. Lopez, Sunnyvale, CA (US)

(73) Assignee: Zenlabs Energy, Inc., Fremont, CA (US)

( * ) Notice: Subject to any disclaimer, the term of this patent is extended or adjusted under 35 U.S.C. 154(b) by 380 days.

(21) Appl. No.: 13/710,713

(22) Filed: Dec. 11, 2012

(65) Prior Publication Data

US 2013/0149609 A1 Jun. 13, 2013

Related U.S. Application Data

(60) Provisional application No. 61/569,589, filed on Dec. 12, 2011.

(51) Int. Cl.
| | |
|---|---|
| *H01M 4/00* | (2006.01) |
| *H01M 4/505* | (2010.01) |
| *H01M 4/38* | (2006.01) |
| *H01M 4/485* | (2010.01) |
| *H01M 4/583* | (2010.01) |
| *H01M 10/0525* | (2010.01) |

(52) U.S. Cl.
CPC .......... *H01M 4/505* (2013.01); *H01M 4/386* (2013.01); *H01M 4/485* (2013.01); *H01M 4/583* (2013.01); *H01M 10/0525* (2013.01)

(58) Field of Classification Search
CPC ...... H01M 4/505; H01M 4/386; H01M 4/485; H01M 4/583

(Continued)

(56) References Cited

U.S. PATENT DOCUMENTS

| 5,658,693 A | 8/1997 | Thackeray et al. |
| 5,674,645 A | 10/1997 | Amatucci et al. |

(Continued)

FOREIGN PATENT DOCUMENTS

| CN | 1795574 A | 6/2006 |
| EP | 2264814 A1 | 12/2010 |

(Continued)

OTHER PUBLICATIONS

Johnson, C. S., et al. "Lithium-manganese oxide electrodes with layered-spinel composite structures $xLi_2MnO_3 \cdot (1-x) Li_{1+y}Mn_{2-y}O_4$ ($0<x<1$, $0<y<0.33$) for lithium batteries." Electrochemistry communications 7.5 (2005): 528-536.*

(Continued)

*Primary Examiner* — Nicholas P D'Aniello
(74) *Attorney, Agent, or Firm* — Christensen, Fonder, Dardi & Herbert PLLC; Peter S. Dardi

(57) ABSTRACT

Electrochemically active material comprising a lithium metal oxide composition approximately represented by the formula $Li_{1+b}Co_mNi_nMn_pO_{(2)}$, where $-0.2 \leq b \leq 0.2$, $0.2 \leq m \leq 0.45$, $0.055 \leq n \leq 0.24$, $0.385 \leq p \leq 0.72$, and m+n+p is approximately 1 has been synthesized and assembled to batteries. The electrochemical performance of the batteries was evaluated. The lithium metal oxide composition in general comprises a first layered phase, a second layered phase and a spinel phase. A layered $Li_2MnO_3$ phase is at least partially activated upon charging to 4.5V. In some embodiments, the material further comprises a stabilization coating covering the lithium metal oxide composition.

20 Claims, 21 Drawing Sheets

(58) Field of Classification Search
USPC .................................................. 429/223
See application file for complete search history.

(56) References Cited

U.S. PATENT DOCUMENTS

| | | | |
|---|---|---|---|
| 6,037,095 A | 3/2000 | Miyasaka | |
| 6,087,042 A | 7/2000 | Sugiyama et al. | |
| 6,168,887 B1 | 1/2001 | Dahn et al. | |
| 6,183,718 B1 | 2/2001 | Barker et al. | |
| 6,248,477 B1 | 6/2001 | Howard, Jr. et al. | |
| 6,251,822 B1 | 6/2001 | Peng et al. | |
| 6,322,744 B1 | 11/2001 | Kelley et al. | |
| 6,372,385 B1 | 4/2002 | Kweon et al. | |
| 6,420,071 B1 | 7/2002 | Lee et al. | |
| 6,428,766 B1 | 8/2002 | Fujino et al. | |
| 6,489,060 B1 | 12/2002 | Zhang et al. | |
| 6,589,499 B2 | 7/2003 | Gao et al. | |
| 6,596,435 B2 | 7/2003 | Kelley et al. | |
| 6,660,432 B2 | 12/2003 | Paulsen et al. | |
| 6,677,082 B2 | 1/2004 | Thackeray et al. | |
| 6,680,143 B2 | 1/2004 | Thackeray et al. | |
| 6,749,648 B1 | 6/2004 | Kumar et al. | |
| 6,872,491 B2 | 3/2005 | Kanai et al. | |
| 6,964,828 B2 | 11/2005 | Lu et al. | |
| 7,078,128 B2 | 7/2006 | Lu et al. | |
| 7,135,252 B2 | 11/2006 | Thackeray et al. | |
| 7,205,072 B2 | 4/2007 | Kang et al. | |
| 7,285,357 B2 | 10/2007 | Jordy et al. | |
| 7,303,840 B2 | 12/2007 | Thackeray et al. | |
| 7,351,494 B2 | 4/2008 | Hennige et al. | |
| 7,364,793 B2 | 4/2008 | Paulsen et al. | |
| 7,368,071 B2 | 5/2008 | Dahn et al. | |
| 7,393,476 B2 | 7/2008 | Shiozaki et al. | |
| 7,416,813 B2 | 8/2008 | Fujihara et al. | |
| 7,435,402 B2 | 10/2008 | Kang et al. | |
| 7,452,631 B2 | 11/2008 | Kitao et al. | |
| 7,468,223 B2 | 12/2008 | Thackeray et al. | |
| 7,517,613 B2 | 4/2009 | Yuasa et al. | |
| 7,556,655 B2 | 7/2009 | Dahn et al. | |
| 7,575,830 B2 | 8/2009 | Kuwamura et al. | |
| 7,674,557 B2 | 3/2010 | Sun et al. | |
| 7,927,506 B2 | 4/2011 | Park | |
| 7,935,270 B2 | 5/2011 | Park | |
| 2002/0055042 A1 | 5/2002 | Kweon et al. | |
| 2002/0114995 A1 | 8/2002 | Thackeray et al. | |
| 2003/0082448 A1 | 5/2003 | Cho et al. | |
| 2003/0087155 A1 | 5/2003 | Cho et al. | |
| 2003/0108790 A1 | 6/2003 | Manthiram et al. | |
| 2004/0076884 A1 | 4/2004 | Lee et al. | |
| 2004/0091779 A1 | 5/2004 | Kang et al. | |
| 2004/0234856 A1* | 11/2004 | Morigaki et al. | 429/231.1 |
| 2004/0234857 A1 | 11/2004 | Shiozaki et al. | |
| 2005/0058588 A1 | 3/2005 | Kang et al. | |
| 2005/0164082 A1* | 7/2005 | Kishi et al. | 429/188 |
| 2005/0202316 A1 | 9/2005 | Hwang et al. | |
| 2005/0220700 A1 | 10/2005 | Suhara et al. | |
| 2006/0051671 A1 | 3/2006 | Thackeray et al. | |
| 2006/0051673 A1 | 3/2006 | Johnson et al. | |
| 2006/0083991 A1 | 4/2006 | Ahn et al. | |
| 2006/0147809 A1 | 7/2006 | Amine et al. | |
| 2006/0188781 A1 | 8/2006 | Thackeray et al. | |
| 2006/0257743 A1 | 11/2006 | Kuratomi et al. | |
| 2006/0275667 A1 | 12/2006 | Watanabe et al. | |
| 2007/0072080 A1 | 3/2007 | Inagaki et al. | |
| 2007/0111098 A1 | 5/2007 | Yang Kook et al. | |
| 2007/0122703 A1 | 5/2007 | Whitfield et al. | |
| 2007/0160906 A1 | 7/2007 | Tooyama et al. | |
| 2007/0202405 A1* | 8/2007 | Shizuka | H01M 4/505 429/231.3 |
| 2007/0212607 A1 | 9/2007 | Fujihara et al. | |
| 2007/0292757 A1 | 12/2007 | Watanabe et al. | |
| 2008/0102369 A1 | 5/2008 | Sakata et al. | |
| 2008/0107968 A1 | 5/2008 | Patoux et al. | |
| 2008/0118847 A1 | 5/2008 | Jung et al. | |
| 2008/0135802 A1 | 6/2008 | Saito et al. | |
| 2008/0157027 A1 | 7/2008 | Manthiram et al. | |
| 2008/0193841 A1 | 8/2008 | Sun et al. | |
| 2008/0241693 A1 | 10/2008 | Fukuchi et al. | |
| 2008/0268347 A1 | 10/2008 | Ohzuku et al. | |
| 2008/0280205 A1 | 11/2008 | Jiang et al. | |
| 2009/0087362 A1* | 4/2009 | Sun et al. | 423/179.5 |
| 2009/0127520 A1 | 5/2009 | Whitfield et al. | |
| 2009/0155694 A1 | 6/2009 | Park | |
| 2009/0170003 A1* | 7/2009 | Chen et al. | 429/231.5 |
| 2009/0263707 A1 | 10/2009 | Buckley et al. | |
| 2009/0297947 A1 | 12/2009 | Deng et al. | |
| 2009/0305131 A1 | 12/2009 | Kumar et al. | |
| 2010/0086853 A1 | 4/2010 | Venkatachalam et al. | |
| 2010/0086854 A1 | 4/2010 | Kumar et al. | |
| 2010/0119942 A1 | 5/2010 | Kumar | |
| 2010/0151332 A1 | 6/2010 | Lopez et al. | |
| 2010/0227222 A1 | 9/2010 | Chang et al. | |
| 2010/0233550 A1 | 9/2010 | Yanagida et al. | |
| 2011/0017528 A1 | 1/2011 | Kumar et al. | |
| 2011/0052981 A1 | 3/2011 | Lopez et al. | |
| 2011/0052989 A1 | 3/2011 | Venkatachalam et al. | |
| 2011/0076556 A1 | 3/2011 | Karthikeyan et al. | |
| 2011/0111294 A1 | 5/2011 | Lopez et al. | |
| 2011/0111298 A1 | 5/2011 | Lopez et al. | |
| 2011/0136019 A1 | 6/2011 | Amiruddin et al. | |
| 2011/0236751 A1 | 9/2011 | Amiruddin et al. | |
| 2011/0244331 A1 | 10/2011 | Karthikeyan et al. | |
| 2012/0028105 A1 | 2/2012 | Kumar et al. | |
| 2012/0056590 A1 | 3/2012 | Amiruddin et al. | |
| 2012/0070725 A1 | 3/2012 | Venkatachalam et al. | |
| 2012/0107680 A1 | 5/2012 | Amiruddin et al. | |
| 2012/0282521 A1 | 11/2012 | Choi et al. | |
| 2012/0295155 A1 | 11/2012 | Deng et al. | |
| 2013/0202953 A1 | 8/2013 | Sharma et al. | |

FOREIGN PATENT DOCUMENTS

| | | |
|---|---|---|
| JP | 57065674 | 4/1982 |
| JP | 06-243871 | 9/1994 |
| JP | 09-045373 | 2/1997 |
| JP | 10-255837 | 9/1998 |
| JP | 3112138 | 9/2000 |
| JP | 3276451 | 2/2002 |
| JP | 2002-110167 | 4/2002 |
| JP | 3506397 | 12/2003 |
| JP | 2006-134816 | 5/2006 |
| JP | 2006-344425 | 12/2006 |
| JP | 2007-220630 A | 8/2007 |
| JP | 2008-536285 | 9/2008 |
| JP | 2008-258160 A | 10/2008 |
| JP | 5023541 | 6/2012 |
| KR | 10-2002-0026655 A | 4/2002 |
| KR | 10-2005-0111764 | 11/2005 |
| KR | 10-0578877 | 5/2006 |
| KR | 10-2007-0117827 A | 12/2007 |
| KR | 10-0796953 B1 | 1/2008 |
| KR | 10-2008-0031616 A | 4/2008 |
| KR | 10-0822013 | 4/2008 |
| KR | 10-2008-0099132 A | 11/2008 |
| KR | 10-2009-0078128 A | 7/2009 |
| WO | 99/60638 A2 | 11/1999 |
| WO | 01/35473 A1 | 5/2001 |
| WO | 01/91209 A1 | 11/2001 |
| WO | 2004/084330 A2 | 9/2004 |
| WO | 2006/025707 A1 | 3/2006 |
| WO | 2006/109930 A1 | 10/2006 |
| WO | 2006/137673 A1 | 12/2006 |
| WO | 2007-094645 | 8/2007 |
| WO | 2008/086041 A1 | 7/2008 |
| WO | 2011-056847 A2 | 5/2011 |

OTHER PUBLICATIONS

Armstrong et al., "Demonstrating Oxygen Loss and Associated Structural Reorganization in the Lithium Battery Cathode Li[NiLiMn]O," J. Am. Chem. Soc., 2006, 128 (26), 8694-8698.

(56) References Cited

OTHER PUBLICATIONS

Aurbach et al. "Studies of cycling behavior, ageing, and interfacial reactions of LiNi0.5Mn1.5O4 and carbon electrodes for lithium-ion 5-V cells," J. of Power Sources 162 (2006) 780-789.
Aurbach et al., "On the capacity fading of LiCoO2 intercalation electrodes: the effect of cycling, storage, temperature, and surface film forming additives," Electrochimica Acta 47 (2002) 4291-4306.
Boulineau et al., "Reinvestigation of Li2MnO3 Structure: Electron Diffraction and High Resolution TEM," Chem. Mater. 2009, 21, 4216-4222.
Chen et al., "Studies of LiCoO2 Coated with Metal Oxides," Electrochemical and Solid State Letters, 6 (11) A221-A224 (2003).
Chen et al., "Effect of a ZrO2 Coating on the Structure and Electrochemistry of LixCoO2 When Cycled to 4.5 V," Electrochemical and Solid-State Letters, 5 (10) A213-A216 (2002).
Cho et al., "Comparison of Al2O3- and AlPO4-coated LiCoO2 cathode materials for a Li-ion cell," J. of Power Sources 146 (2005) 58-64.
Cho et al., "LiCoO2 Cathode Material That Does Not Show a Phase Transition from Hexagonal to Monoclinic Phase," J. of the Electrochemical Society, 148 (10) A1110-A1115 (2001).
Cho et al., "High-Performance ZrO2-Coated LiNiO2 Cathode Material," Electrochemical and Solid-State Letters, 4 (10) A159-A161 (2001).
Cho et al., "Zero-Strain Intercalation Cathode for Rechargeable Li-Ion Cell," Angew. Chem. Int. Ed. 2001, 40 (18): 3367-3369.
Cho et al., "Novel LiCoO2 Cathode Material with Al2O3 Coating for a Li Ion Cell," Chem. Mater. 2000, 12 (12), 3788-3791.
Choi et al., "Superior Capacity Retention Spinel Oxyfluoride Cathodes for Lithium-Ion Batteries," Electrochemical and Solid-State Letters 9 (5) (2006) A245-A248.
Fey et al., "Enhanced cyclability of LiCoO2 cathodes coated with alumina drived from carboxylate-alumoxanes," J. of Applied Electrochemistry (2005) 35:177-184.
Fey et al., "Preformed boehmite nanoparticles as coating materials for long-cycling LiCoO2," J. of Applied Electrochemistry 34:715-722 (2004).
Fey et al., "A simple mechano-thermal coating process for improved lithium battery cathode materials," J. of Power Sources 132 (2004) 172-180.
Kang et al., "Development of high-capacity cathode materials with integrated structures," DOE Vehicle Technology Prorogram Annual Merit Review, EERE, 14 pages, (May 2009).
Search Report and Written Opinion for corresponding International Patent Application No. PCT/US2012/068948, dated Mar. 25, 2013.
Ho et al., "Application of A-C Techniques to the Study of Lithium Diffusion in Tungsten Trioxide Thin Films," J. Electrochem. Soc., 1980; 127(2):343-350.
Hong et al., "Structural evolution of layered Li1.2Ni0.2Mn0.6O2 upon electrochemical cycling in a Li rechargeable battery," J. Mater. Chem., 2010, 20, 10179-10186.
Hwang et al. "Influence of Mn content on the morphology and electrochemical performance of LiNi1-x-yCoxMnyO2 cathode materials," J. Mater. Chem., 2003; 13:1962-1968.
Ito et al., "The relationship between crystal structure and the electrochemical reaction of Li-rich insertion materials (2)" 2010.
Ito et al., "Cyclic deterioration and it's improvement for Li-rich layered cathode material Li [Ni0.17Li0.2Co0.07Mn0.56]O2," Journal of Power Sources, 195: 567-573 (2010).
Ito et al., "A new approach to improve the high-voltage cyclic performance of Li-rich layered cathode material by electrochemical pretreatment," Journal of Power Sources 183: 344-346 (2008).
Johnson et al., "Lithium-manganese oxide electrodes with layered-spinel composite structures xLi2MnO3 • (1-x)Li1+yMn2-yO4 (0<x<1, 0≤y≤0.33) for lithium batteries," Electrochemistry Communications 7 (2005) 528-536.
Johnson et al. "The significance of the Li2MnO3 component in 'composite' xLi2MnO3 • (1-x)LiMn0.5Ni0.5O2 electrodes," Electrochemistry Communications 6 (2004) 1085-1091.

(2009—Thackeray) Kang et al., "Enhancing the rate capability of high capacity xLi2Mn03 • (1-x)LiMO2 (M=Mn, Ni, Co) electrodes by Li—Ni—PO4 treatment," Electrochemistry Communications 11 (2009) 748-751.
Kang et al., "The Effects of Acid Treatment on the Electrochemical Properties of 0.5 Li2MnO3•0.5 LiNi0.44Co0.25Mn0.31O2 Electrodes in Lithium Cells," Journal of the Electrochemical Society 153(6):A1186-A1192 (2006).
Kang et al., "Layered Li(Li0.2Ni0.15+0.5zCo0.10Mn0.55-0.5z)O2-zFz cathode materials for Li-ion secondary batteries," Journal of Power Sources 146 (2005) 654-657.
Kim et al., "Remarkable improvement in cell safety for Li[Ni0.5Co0.2Mn0.3]O2 coated with LiFePO4," Journal of Alloys and Compounds 492 (2010) L87-L90.
(2006—SunYK-EA) Kim et al., "Synthesis of spherical Li[Ni(1/3-z)Co(1/3-z)Mn(1/3-z)Mgz]O2 as positive electrode material for lithium ion battery," Electrochimica Acta 51 (2006) 2447-2453.
(2005—SunYK-ECS) Kim et al., "Improvement of High-Voltage Cycling Behavior of Surface-Modified Li [Ni1/3Co1/3Mn1/3]02 Cathodes by Fluorine Substitution for Li-Ion Batteries," Journal of the Electrochemical Society 152 (9) A1707-A1713 (2005).
Kim et al., "Electrochemical and Structural Properties of xLi2M'O3•(1-x)LiMn0.5Ni0.5O2 Electrodes for Lithium Batteries (M'=Ti, Mn, Zr; 0≤x≤0.3)" Chem. Mater. 2004, 16, 1996-2006.
Kim et al., "Electrochemical Stability of Thin-Film LiCoO2 Cathodes by Aluminum-Oxide Coating," Chem. Mater. 2003, 15(7):1505-1511.
(2006—SunYK-JPS) Lee et al., "High capacity Li[Li0.2Ni0.2Mn0.6]O2 cathode materials via a carbonate co-precipitation method," J. of Power Sources, 162 (2006), 1346-1350.
Lee et al., "Electrochemical characteristics of Al2O3-coated lithium manganese spinel as a cathode material for a lithium secondary battery," J. of Power Sources 126 (2004) 150-155.
(2009—Manthiram) Luo et al., "On the incorporation of fluorine into the manganese spinel cathode lattice," Solid State Ionics 180 (2009) 703-707.
Myung et al., "Effect of AlF3 Coating on Thermal Behavior of Chemically Delithiated Li0.35[Ni1/3Co1/3Mn1/3]O2," J Phys. Chem. C, 114 (10): 4710-4718 (2010).
Okumura et al., "Cathode having high rate performance for a secondary Li-ion cell surface-modified by aluminum oxide nanoparticles," J. of Power Sources 189 (2009) 471-475.
Ohsawa et al., "The relationship between crystal structure and the electrochemical reaction of Li-rich insertion materials (1)," 2010.
Park et al., "Physical and electrochemical properties of spherical Li1+x(Ni1/3Co1/3Mn1/3)1-xO2 cathode materials", Journal of Power Sources, 177:177-183 (2008).
Park et al., "Lithium-manganese-nickel-oxide electrodes with integrated layered-spinel structures for lithium batteries," Electrochemistry Communications 9 (2007) 262-268.
Robertson et al., "Mechanism of Electrochemical Activity in Li2MnO3," Chem. Mater. 2003, 15, 1984-1992.
Shin et al., "Improvement of electrochemical properties of Li[Ni0.4Co0.2Mn(0.4-x)]O2-yFy cathode materials at high voltage region", Electrochimica Acta 52: 1477-1482 (2006).
Song et al., "Two- and three-electrode impedance spectroscopy of lithium-ion batteries," J. of Power Sources, 2002; 111:255-267.
Sun et al, "AlF3-Coating to Improve High Voltage Cycling Performance of Li[Ni1/3Co1/3Mn1/3]O2 Cathode Materials for Lithium Secondary Batteries," J. of the Electrochemical Society, 154 (3), A168-A172 (2007).
Sun et al., "The preparation and electrochemical performance of solid solutions LiCoO2—Li2MnO3 as cathode materials for lithium ion batteries," J of Power Sources 159 (2006) 1353-1359.
Sun et al., "Significant Improvement of high voltage cycling behavior AlF3-coated LiCoO2 cathode," Electrochemistry Communications 8 (2006) 821-826.
Thackeray et al., "Li2MnO3-stabilized LiMO2 (M=Mn, Ni, Co) electrodes for lithium-ion batteries," J. Mater. Chem., 2007; 17:3112-3125.
Thackeray et al., "Comments on the structural complexity of lithium-rich Li1+xM1-xO2 electrodes (M=Mn,Ni,Co) for lithium batteries," Electrochemistry Communications 8 (2006), 1531-1538.

(56) References Cited

OTHER PUBLICATIONS

Thackeray et al., "Advances in manganese-oxide 'composite' electrodes for lithium-ion batteries," J. Mater. Chem., 2005,15, 2257-2267.

(2007—SunYK) Woo et al., "Significant Improvement of Electrochemical Performance of AlF3-Coated Li [Ni0.8Co0.1Mn0.1]O2 Cathode Materials," J. of the Electrochemical Society, 154 (11) A1005-A1009 (2007).

Wu et al., "High Capacity, Surface-Modified Layered Li[Li(1-x)/3Mn(2-x)/3Nix/3Cox/3]O2 Cathodes with Low Irreversible Capacity Loss," Electrochemical and Solid State Letters, 9 (5) A221-A224 (2006).

Yabuuchi et al., "Detailed Studies of a High-Capacity Electrode Material for Rechargeable Batteries, Li2MnO3—LiCo1/3Ni1/3Mn1/3O2," J. Am. Chem. Soc. 2011, 133, 4404-4419.

Yabuuchi et al., "Study of Li2MnO3—Li(Co1/3Ni1/3Mn1/3)O2 for High Capacity Positive Electrode Material: II. Redox Reaction at the Positive Electrode/Electrolyte Interface," 2010.

Yoshii et al., "Study of Li2MnO3—Li(Co1/3Ni1/3Mn1/3)O2 for High Capacity Positive Electrode Material: I. Change in the Crystal and Electronic Structure upon Li de-intercalation," 2010.

Zheng et al., "The Effects of AlF3 Coating on the Performance of Li[Li0.2Mn0.54Ni0.13Co0.13]O2 Positive Electrode Material for Lithium-Ion Battery," Journal of the Electrochemical Society, 155 (10)A775-A782 (2008).

Fey et al., "Saturated linear dicarboxylic acids as chelating agents for the sol-gel synthesis of LiNi0.8Co0.2O2," Materials Chemistry and Physics 87 (2004) 246-255.

Taiwan Office Action with translated search report from corresponding Taiwan App. No. 101147047, dated May 12, 2014 (6 pages).

\* cited by examiner

Fig. 2
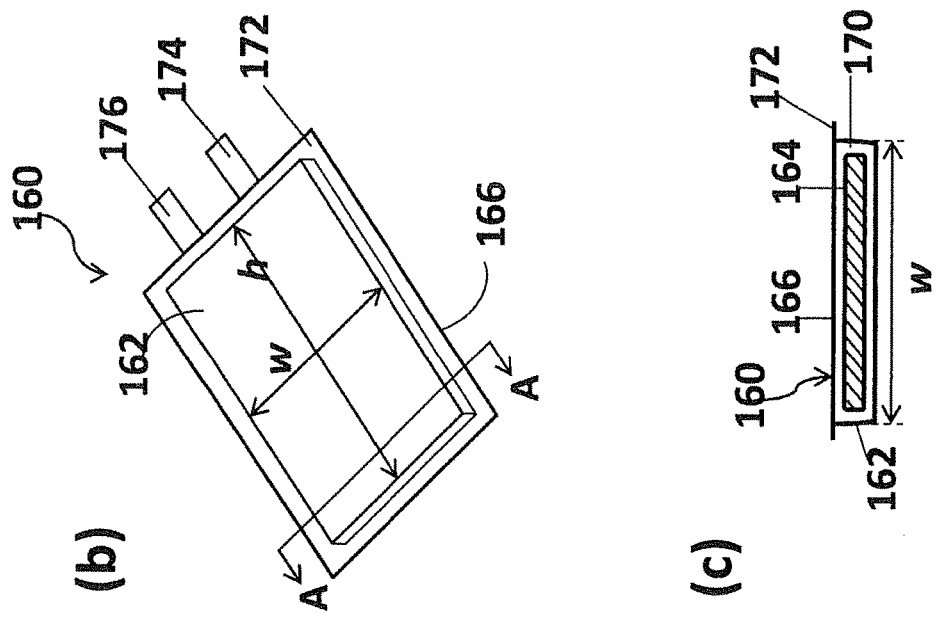
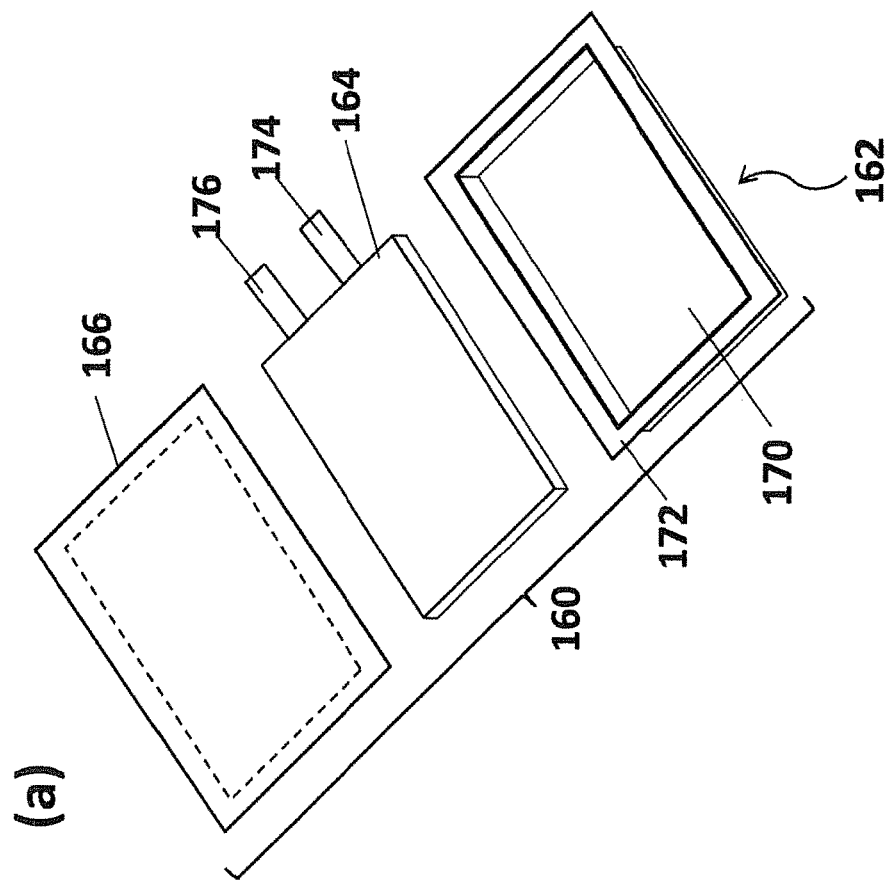

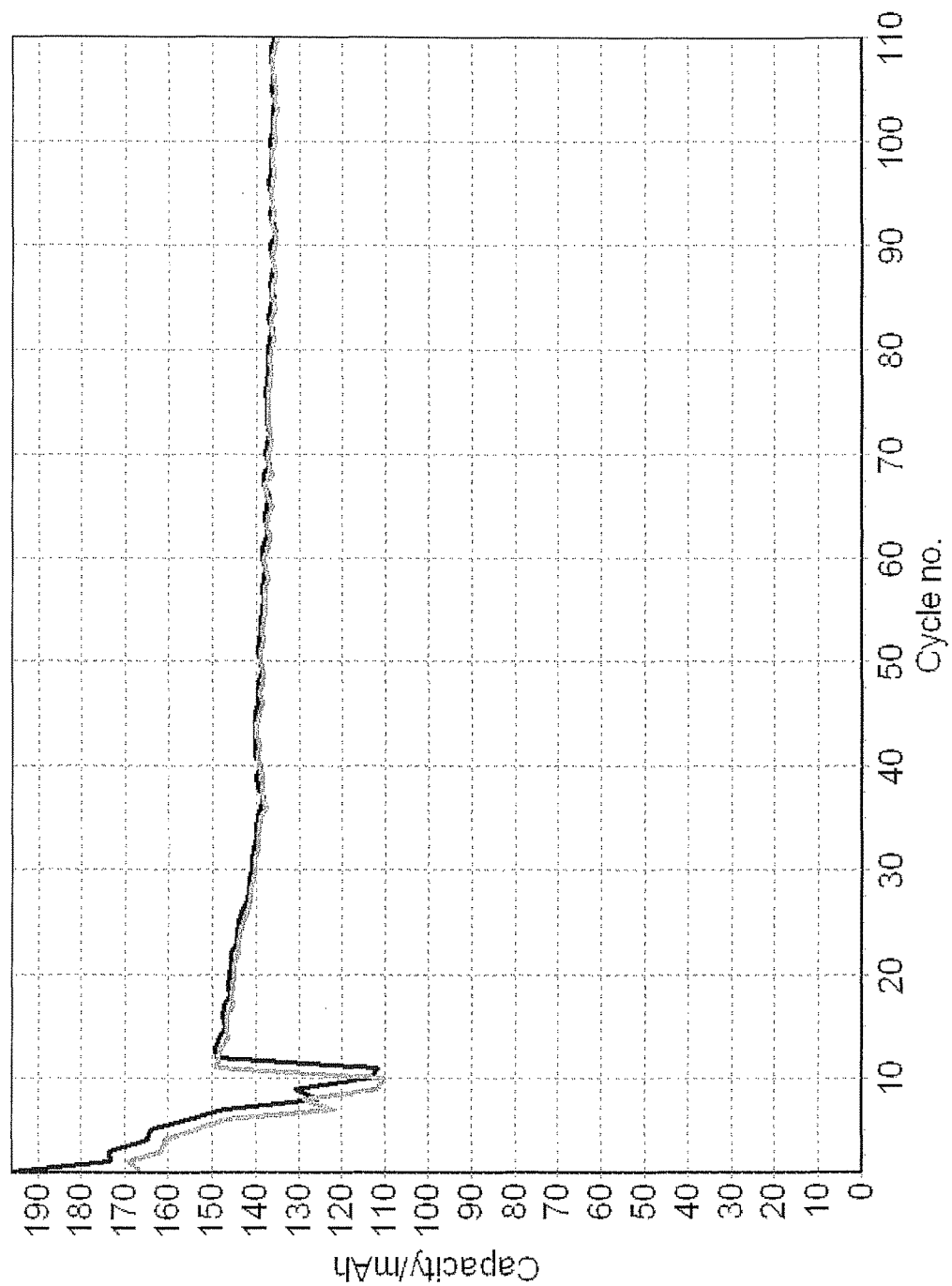

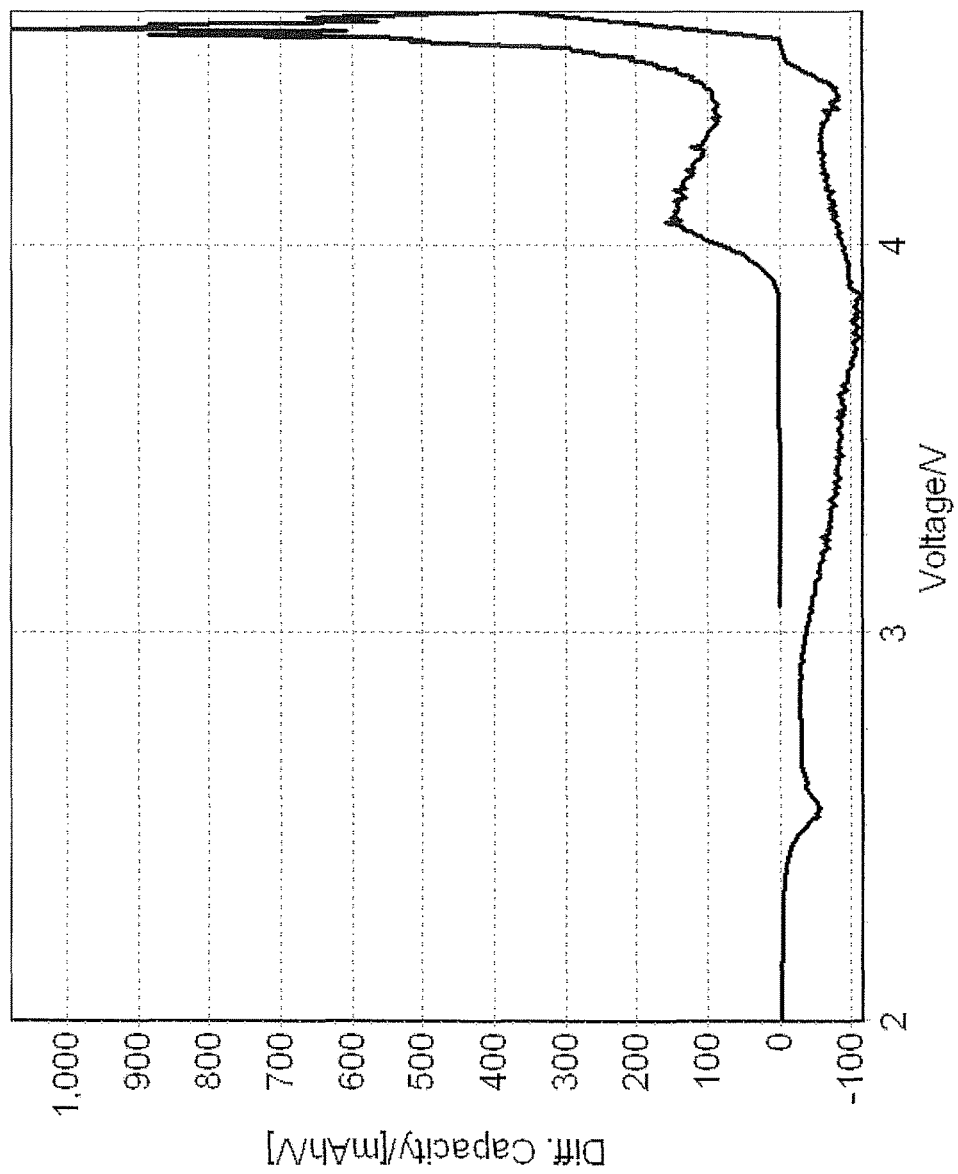

LITHIUM METAL OXIDES WITH MULTIPLE PHASES AND STABLE HIGH ENERGY ELECTROCHEMICAL CYCLING

CROSS REFERENCE TO RELATED APPLICATIONS

This application claims priority to copending U.S. provisional patent application 61/569,589 filed on Dec. 12, 2011 to Deng et al., entitled "Lithium Metal Oxides With Multiple Phases and Stable High Energy Electrochemical Cycling," incorporated herein by reference.

FIELD OF THE INVENTION

The invention relates to complex lithium metal oxide compositions that are useful for positive electrode active materials in lithium ion batteries.

BACKGROUND OF THE INVENTION

Rechargeable lithium ion batteries, also known as secondary lithium ion batteries are desirable as power sources for a wide range of applications. Their desirability stems from their relative high energy density. The capacities of secondary lithium ion batteries have been greatly improved with the development of high capacity lithium rich metal oxides for use as positive electrode active materials. With cycling, however, secondary lithium ion batteries generally have decreased performance with increased cycle number. For some important applications, such as vehicle application, it is desired that secondary lithium ion batteries be able to charge and recharge for many cycles without a great loss of performance.

SUMMARY OF THE INVENTION

In a first aspect, the invention pertains to a lithium metal oxide (LMO) material comprising an electrochemically active composition approximately represented by the formula $Li_{1+b}Co_mNi_nMn_pO_{(2)}$, where $-0.2 \leq b \leq 0.2$, $0.2 \leq m \leq 0.45$, $0.055 \leq n \leq 0.24$, $0.385 \leq p \leq 0.72$, and m+n+p is approximately 1, wherein up to about 5 mole percent of the transition metals can be substituted with a metal dopant having layered-layered-spinel crystal phases. In some embodiments, $0 \leq b \leq 0.15$. In some embodiments, $0.2 \leq m \leq 0.3$, $0.07 \leq n \leq 0.24$, $0.49 \leq p \leq 0.72$. In other embodiments, $0.2 \leq m \leq 0.45$, $0.11 \leq n \leq 0.24$, $0.385 \leq p \leq 0.64$. In still other embodiments, $0.2 \leq m \leq 0.3$, $0.14 \leq n \leq 0.24$, $0.49 \leq p \leq 0.64$. In some embodiments, the active composition is approximately free of dopants. The electrochemically active composition in general comprises a $Li_2MnO_3$ phase that is activated upon charging to 4.5V. In some embodiments, the LMO material further comprises a stabilization coating covering the electrochemically active composition. The stabilization coating can comprise for example a metal oxide or a metal halide.

In a second aspect, the invention pertains to a lithium based battery that comprises a positive electrode material formed from the LMO material, a negative electrode, a separator between the positive electrode and the negative electrode, and an electrolyte comprising lithium ions. In some embodiments, the negative electrode of the battery comprises an active material that intercalates or alloys with lithium. In some embodiments, the negative electrode of the battery comprises graphitic carbon or lithium titanium oxide. In some embodiments, the negative electrode of the battery comprises a silicon based composition.

In a third aspect, the invention pertains to a method for synthesizing the electrochemically active composition. The method can comprise precipitating a precursor composition comprising the desired transition metal ratios and heating the composition in an atmosphere comprising oxygen to form the electrochemically active composition.

In a fourth aspect, the invention pertains to a method for synthesizing the electrochemically active material of claim 1. The method can comprise mixing solid precursor compositions comprising the transition metals in the mole ratio desired to form a precursor mixture and heating the mixture in an atmosphere comprising oxygen.

BRIEF DESCRIPTION OF THE DRAWINGS

FIG. 2(a) is a pouch battery with a battery core separated from two portions of the pouch case.

FIG. 2(b) is a perspective lower face view of the assembled pouch battery of FIG. 2(a).

FIG. 2(c) is a bottom plan view of the pouch battery of FIG. 2(b).

FIG. 10 is plot of capacity versus cycle number of the battery of example 3 cycled out to 110 cycles.

FIG. 17A is plot of the first cycle charge and discharge differential capacity of the battery of example 4 between 4.6 V and 2.0V.

DETAILED DESCRIPTION

Figure 1:
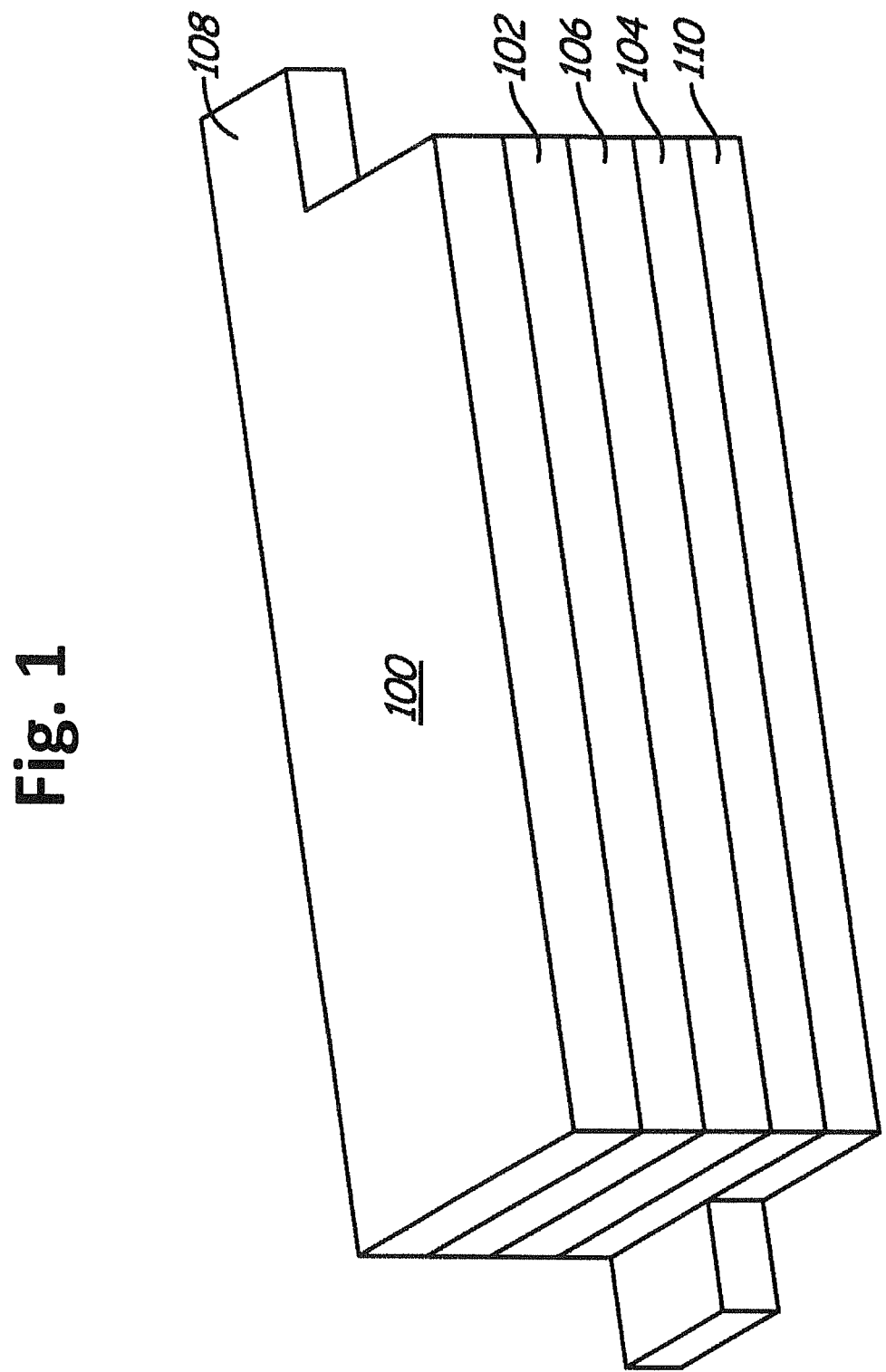
FIG. 1 is schematic diagram of a battery structure separated from a battery container.

New lithium metal oxide compositions have been discovered with desirable high capacity cycling properties. The design of the new compositions has been guided by the understanding that desirable mixed phase lithium metal oxides can provide appropriate stabilization of the resulting material during battery cycling. The compositions can range from somewhat lithium rich to somewhat lithium deficient relative to a reference $LiMO_2$ compound. The compositions of particular interest comprise transition metals manganese, nickel and cobalt metals and in general are somewhat manganese rich. In particular, in some embodiments, the compositions can have a layered $LiMO_2$ phase, a layered $Li_2MO_3$ phase and a spinel phase. During battery charging and lithium abstraction from the active material, at least a portion of the $Li_2MO_3$ phase is activated at a relatively high voltage through an irreversible reaction of the composition to form another phase with reasonable cycling stability.

The batteries described herein are lithium-based batteries in which a non-aqueous electrolyte solution comprises lithium ions. For secondary lithium ion batteries during charge, oxidation takes place in the cathode (positive electrode) where lithium ions are extracted and electrons are released. During discharge, reduction takes place in the cathode where lithium ions are inserted into the active material and electrons are consumed. Generally, the batteries are formed with extractable lithium ions in the positive electrode material such that an initial charge of the battery transfers a significant fraction of the lithium from the positive electrode material to the negative electrode (anode) material to prepare the battery for discharge. Unless indicated otherwise, performance values referenced herein are at room temperature, i.e., from 22° C. to 25° C.

When the corresponding batteries with intercalation-based positive electrode active materials are in use, the intercalation and release of lithium ions from the lattice induces changes in the crystalline lattice of the electroactive materials. As long as these changes are essentially reversible, the capacity of the material does not change significantly with cycling. However, the capacity of the active materials is observed to decrease with cycling to varying degrees. Thus, after a number of cycles, the performance of the battery falls below acceptable values, and the battery is replaced.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic.

To provide a conceptual framework, the compositions can be referenced to a ternary phase diagram with $LiMnO_2$, $LiCoO_2$ and $LiNiO_2$ at the vertices of a triangular diagram. However, it is clear from the discussion below that the phase diagram is a significant simplification of the compositional complexities. Based on the phase diagram, compositions can be written for convenience as $aLiMnO_2+bLiCoO_2+cLiNiO_2$ or as $LiMn_aNi_bCo_cO_2$, although in some embodiments the compositions can further comprise a metal dopant that can comprise up to 5 mole percent of the transition metal in the composition. Suitable metal elements for dopants can include, for example, Mg, Sr, Ba, Cd, Zn, Al, Ga, B, Zr, Ti, Ca, Ce, Y, Nb, Cr, Fe, V, or combinations thereof. The compositions of interest represent a portion of the phase diagram identified for a desirable crystal structure and corresponding electrochemical performance with respect to specific capacity and cycling. Additionally, it has been found that corresponding compositions can be somewhat lithium rich or lithium deficient, in particular, if represented by formula, the composition can be expressed as $Li_{1+x}[Mn-NiCo]_{1+y}O_2$, where independently $-0.2 \leq x \leq 0.2$, $-0.2 \leq y \leq 0.15$, and [MnNiCo] represents a combination of these three transition metal elements along with an optional metal dopant. A person of ordinary skill in the art will recognize that subranges of x and y within the explicit ranges above are contemplated and are within the present disclosure. Suitable synthesis techniques are discussed for the synthesis of the desired materials and with the target crystal structure.

Lithium rich metal oxides have been found to form high capacity materials that cycle at an average voltage between 3 and 4 volts and have good cycling behavior. These lithium rich materials are believed to have composite layered-layered crystal structures with one phase being essentially $Li_2MnO_3$ and a second phase being $LiMnO_2$. The general class of compositions are described further, for example, in published U.S. patent application 2011/0052981 (the '981 application) to Lopez et al., entitled "Layer-Layer Lithium Rich Complex Metal Oxides With High Specific Capacity and Excellent Cycling," incorporated herein by reference. The '981 application describes the engineering of the specific stoichiometries to achieve target performance properties.

It has been found that the $Li_2MnO_3$ phase of these materials is unstable upon extraction of the lithium during battery charging due to decomposition reactions. In particular, upon extraction of the lithium a proposed depiction of a decomposition reaction involved can be expressed as $Li_2MnO_3 \rightarrow (MnO_2) + 2Li^+ + 2e^- + \frac{1}{2}O_2$, although Applicant does not wish to be limited by theory. Oxygen evolves in this proposed process, and gas is observed to be formed in these batteries that should be vented to avoid pressure build up. The extraction of lithium from the $Li_2MnO_3$ phase can be referred to as an activation step. The notation $(MnO_2)$ represents the product phase resulting from the decomposition of the $Li_2MnO_3$. The chemistry of the activation reaction is complex. In general, the high voltage cycling of the material with a charge voltage of 4.5V against graphite results in a material that gradually decomposes with loss of transition metals to the electrolyte and a drop in capacity. It has been found that the drop in capacity can be slowed very dramatically through the addition of supplemental lithium to the battery. Thus, the supplemental lithium seems to either stabilize a particular phase or result in the formation of an alternative phase. The use of supplemental lithium to stabilize the capacity is described further in copending U.S. patent application Ser. No. 12/938,073 to Amiruddin et al. (the '073 application), entitled "Lithium Ion Batteries With Supplemental Lithium," incorporated herein by reference.

However, cycling the battery with supplemental lithium results in an unknown evolution of the crystal structure that results in a gradual drop in average voltage even as the capacity remains very stable. It has been found that the cycling over an appropriately selected voltage window after activation of the $Li_2MnO_3$ phase can stabilize the capacity at a lower but still relatively high value without supplemental lithium while stabilizing the average voltage, and the stability can be maintained out to several thousand cycles. The use of selected voltage windows to stabilize the cycling is described further in published U.S. patent application 2012/0056590 (the '590 application) to Amiruddin et al., entitled "Very Long Cycling of Lithium Ion Batteries With Lithium Rich Cathode Materials," incorporated herein by reference.

A close examination of the electrochemical performance of the lithium rich compositions during cycling has suggested the formation of a spinel phase. This examination is described in the Examples below. As described herein, compositions are designed to introduce a spinel phase in the initial material along with composite layered-layered phases to form overall a layered-layered-spinel composite crystal structure. Appropriate engineering of the phase of the materials is directed to the formation of a composition with improved cycling stability over a broader voltage range.

A composition range has been identified for the synthesized materials that have a layered-layered-spinel multiple phase crystal structure in which an $Li_2MnO_3$ phase at least partially activates with cycling. The presence of the multiple phase crystal structures with spinel and planar phases can be confirmed using x-ray diffraction and electrochemical data. Specifically, the x-ray diffractogram has an enhanced intensity for a right hand peak of a scattering doublet at values of $2\theta$ of about 65-66 degrees and a broad peak at scattering angles of 78 degrees has a relatively increased intensity. Specifically, the scattering doublet has a right hand peak that is at least 10% greater scattering intensity than the left hand peak. Also, the initial charge exhibits three peaks in the differential capacity plots with a peak below 3 volts indicating a spinel phase, a first peak at greater than 3 volts presumably corresponding to a planar $LiMO_2$ and a second higher voltage peak at greater than about 4.2 volts presumably corresponding to a $Li_2MnO_3$ phase. The discharge differential capacity also exhibits three peaks appropriately shifted to lower voltages relative to the peaks. The $Li_2MnO_3$ phase at least partially activates at voltages above about 4.4V versus lithium, and activation is characterized by the appearance of lower voltage phases in differential capacity plots. The formation of a layered-layered-spinel mixed phase lithium metal oxide with a low amount of cobalt is described in copending provisional patent application 61/595,993 to Sharma et al, entitled "Mixed Phase Lithium Metal Oxide Compositions With Desirable Battery Performance," incorporated herein by reference. The '993 provisional application described other approaches for spinel phase evaluation that are consistent with the results described herein.

The composition range can be referenced relative to a wedge on the three component phase diagram noted above. Also, the compositions can be lithium rich or lithium deficient relative to the reference compositions. In particular, the portion of the composition noted as [MnNiCo] can be referenced to the phase diagram with specific compositions for the four vertices of the composition wedge. The four compositions forming the corners of the phase diagram wedge are specifically 1) 0.45 $LiCoO_2$+0.055 $LiNiO_2$+0.495 $LiMnO_2$; 2) 0.2 $LiCoO_2$+0.08 $LiNiO_2$+0.72 $LiMnO_2$; 3) 0.2 $LiCoO_2$+0.24 $LiNiO_2$+0.56 $LiMnO_2$; 4) 0.45 $LiCoO_2$+0.165 $LiNiO_2$+0.385 $LiMnO_2$. Any points within these points along the phase diagram would be within the specified values of [MnNiCo]. These compositions can be written in terms of their overall compositions as follows: 1) $LiCo_{0.45}Ni_{0.055}Mn_{0.495}O_2$; 2) $LiCo_{0.2}Ni_{0.08}Mn_{0.72}O_2$; 3) $LiCo_{0.2}Ni_{0.24}Mn_{0.56}O_2$; 4) $LiCo_{0.45}Ni_{0.165}Mn_{0.385}O_2$. Thus, the selected compositions then can be referenced approximately to a composition with a formula $LiCo_mNi_nMn_pO_2$, where $0.2 \leq m \leq 0.45$, $0.055 \leq n \leq 0.24$, $0.385 \leq p \leq 0.72$, where m+n+p is approximately 1. Lithium rich and lithium deficient variations on these compositions are also contemplated. Specifically, compositions of relevance comprise $Li_{1+b}Co_mNi_nMn_pO_2$, where $-0.2 \leq b \leq 0.2$ and m, n, p are specified above. In further embodiments, $-0.15 \leq b \leq 0.2$, in other embodiments $0 \leq b \leq 0.2$, and in additional embodiments $-0.05 \leq b \leq 0.15$. A person of ordinary skill in the art will recognize that additional subranges of parameters b, m, n and p within the explicit ranges above are contemplated and are within the present disclosure. As used herein, including in the claims, unless indicated otherwise the symbols "≤" and "≥" implicitly refer to approximate satisfaction of the limiting values reflective of the nature uncertainly in the measurement of real values based on any experimental technique.

However, the actual amounts of oxygen in the composition are not fixed by the synthesis approach and generally can adjust accordingly based on the oxidation states of the metals in the product compositions. In some embodiments, the formula of the active material can therefore be written as $Li_{1+b}Co_mNi_nMn_pO_{2\pm\delta}$, where $\delta$ is an unknown variable that allows for the adjustment of the oxygen content to provide for electrical neutrality. For convenience, this composition can be equivalently written as $Li_{1+b}Co_mNi_nMn_pO_{(2)}$ to reflect known relative amounts of metal and generally less know precise oxygen content. However, the adjustment of the oxygen content may not always be significant. In general, the metal composition only is determined from elemental analysis, such as with ICP-AES or similar techniques, so that the above formula is at least arguably more reflective of the know properties of the composition. Under reasonable synthesis conditions, the relative amounts of metal ions and the electronegativity of the metals determines the charge of the metal ions and the corresponding amount of oxygen in the composition. Thus, in the context of these lithium metal oxides being stable in air, the material composition is essentially determined by the relative amounts of metal ions. The solid phase synthesis method described herein advantageously provides relatively precise stoichiometry of the metal ions with each transition metal Mn, Ni, and Co adopting an oxidation state under heated conditions in air.

While the formula in the above paragraph is conceptually desirable since the oxygen content adjusts as appropriate, but for reference to other work it can be desirable to write the formula in alternative form. In particular, equating the compositions based on their alternative approximate formulas indicates that $Li_{1+b}Co_mNi_nMn_pO_{2\pm\delta}$ is equivalent to $Li_{1+x}[Mn_mNi_nCo_p]_{1+y}O_2$, where $x=(2b\pm\delta)/(2\pm\delta)$, $y=2/(2\pm\delta)-1$, $\delta=\pm(2-2/(1+y))$, $b=(x-y)/(1+y)$.

Ranges for x and y are given above, and these ranges for x and y provide corresponding ranges for b and $\delta$. Generally, $-0.5 \leq b \leq 0.4375$, in further embodiments, $-0.2 \leq b \leq 0.2$ and in additional embodiments, $0 \leq b \leq 0.15$. Similarly, $-0.5 \leq \delta \leq 0.5$, in further embodiments $-0.2 \leq \delta \leq 0.2$ and in additional embodiments $-0.1 \leq \delta \leq 0.1$. A person of ordinary skill in the art will recognize that additional ranges of b and $\delta$ within the explicit ranges above are contemplated and are within the present disclosure.

A few sub-regions of the composition ranges can be of interest. For example, one region would cover the lower amounts of cobalt, which may be desirable for environmental reasons. Thus, boundaries for compositions having reduced amounts of cobalt can be as follows: 1) $LiCo_{0.3}Ni_{0.07}Mn_{0.63}O_2$; 2) $LiCo_{0.2}Ni_{0.08}Mn_{0.72}O_2$; 3) $LiCo_{0.2}Ni_{0.24}Mn_{0.56}O_2$; 4) $LiCo_{0.3}Ni_{0.21}Mn_{0.49}O_2$. More generally, these compositions can be written as $Li_{1+b}Co_mNi_nMn_pO_2$, where $-0.15 \leq b \leq 0.2$, $0.2 \leq m \leq 0.3$, $0.07 \leq n \leq 0.24$, $0.49 \leq p \leq 0.72$, where m+n+p is approximately 1. Another composition sub-region of interest can comprise the compositions with somewhat higher ratios of nickel relative to manganese. The boundaries for these compositions can be specified as follows: 1) $LiCo_{0.45}Ni_{0.11}Mn_{0.44}O_2$; 2) $LiCo_{0.2}Ni_{0.16}Mn_{0.64}O_2$; 3) $LiCo_{0.2}Ni_{0.24}Mn_{0.56}O_2$; 4) $LiCo_{0.45}Ni_{0.165}Mn_{0.385}O_2$. More generally, these compositions can be written as $Li_{1+b}Co_mNi_nMn_pO_2$, where $-0.2 \leq b \leq 0.2$, $0.2 \leq m \leq 0.45$, $0.11 \leq n \leq 0.24$, $0.385 \leq p \leq 0.64$, where m+n+p is approximately 1. The combination of these two sub-regions with less cobalt and greater nickel would result in the following composition ranges: 1) $LiCo_{0.3}Ni_{0.14}Mn_{0.56}O_2$; 2) $LiCo_{0.2}Ni_{0.16}Mn_{0.64}O_2$; 3) $LiCo_{0.2}Ni_{0.24}Mn_{0.56}O_2$; 4) $LiCo_{0.3}Ni_{0.21}Mn_{0.49}O_2$. More generally, these compositions can be written as $Li_{1+b}Co_mNi_nMn_pO_2$, where $-0.2 \leq b \leq 0.2$, $0.2 \leq m \leq 0.3$, $0.14 \leq n \leq 0.24$, $0.49 \leq p \leq 0.64$, where m+n+p is approximately 1. These subranges are of course generalizable with respect to variations in lithium and oxygen by adjustment of variable b and δ, as described above. A person of ordinary skill in the art will recognize that additional subranges of parameters b, m, n and p within the explicit ranges above are contemplated and are within the present disclosure.

Various ways can be used to synthesize the selected lithium metal oxide compositions. As described in the examples below, a solid state reaction can be used to synthesize the compositions. Furthermore, precursor compositions for the respective metals, such as the individual metal carbonates or metal hydroxides, can be blended in the desired molar ratios, and then the blended precursors can be heated in an oxygen containing atmosphere to form the corresponding oxides. As described in the examples, a two stage heating process can be used if desired. In general, a lithium composition can be added prior to a first stage and/or a second stage of the heating process. While the solid state reaction approach can be desirable from the precise information provided regarding the metal content, the solid state reactions may influence the degree of crystallinity of the product materials.

However, more desirable approached have been developed for the processing of the compositions to form lithium metal oxides with a high degree of crystallinity. In particular, the positive electrode material can be advantageously synthesized by co-precipitation and sol-gel processes. The use of these synthesis approaches to synthesize lithium rich, layered-layered compositions is described in detail in published U.S. patent application 2010/0086853A (the '853 application) to Venkatachalam et al. entitled "Positive Electrode Material for Lithium Ion Batteries Having a High Specific Discharge Capacity and Processes for the Synthesis of these Materials", and published U.S. patent application 2010/0151332A (the '332 application) to Lopez et al. entitled "Positive Electrode Materials for High Discharge Capacity Lithium Ion Batteries", both incorporated herein by reference.

In some embodiments, the positive electrode material is synthesized by precipitating a mixed metal hydroxide or carbonate composition from a solution comprising +2 transition metal cations wherein the hydroxide or carbonate composition has a selected composition of transition metal cations. A lithium precursor composition, such as lithium carbonate or lithium hydroxide can be blended with the precipitate. The metal hydroxide or carbonate precipitated precursors are then subjected to one or more heat treatments to form a crystalline layered lithium metal oxide composition. In particular, processing of the material can comprise a first heating step to form the oxide composition followed by a second higher temperature anneal step to improve the crystallinity. A carbonate co-precipitation process described in the '332 application gave desired lithium rich metal oxide materials with manganese, nickel and cobalt transitions metals and exhibiting the high specific capacity performance with superior tap density. These patent applications also describe the effective use of metal fluoride coatings to improve performance and cycling.

The development of improved lithium metal oxide compositions is directed to the improved cycling with higher capacity and energy output as well as with other desired performance parameters for battery applications. It has been found that the use of inert coatings over high capacity lithium metal oxides can be effective to improve the cycling while also increasing the specific capacity over reasonable charge/discharge voltage ranges. Suitable coating materials, which are generally believed to be electrochemically inert during battery cycling, can comprise metal fluorides, metal oxides, metal non-fluoride halides or metal phosphates. The results in the Examples below are based on un-coated positive electrode active materials, and it is believed that improved results can follow for corresponding coated materials.

The general use of metal fluoride compositions as coatings for cathode active materials, specifically $LiCoO_2$ and $LiMn_2O_4$, is described in published PCT application WO 2006/109930A to Sun et al., entitled "Cathode Active Material Coated with Fluorine Compound for Lithium Secondary Batteries and Method for Preparing the Same," incorporated herein by reference. Improved metal fluoride coatings with appropriately engineered thicknesses are described in copending U.S. patent application 2011/0111298 to Lopez et al, (the '298 application) entitled "Coated Positive Electrode Materials for Lithium Ion Batteries," incorporated herein by reference. In general, the method for the formation of a coated lithium metal oxide material with a metal halide coating comprise a solution phase deposition step and a heating step directed to the dried powder obtained from the deposition step. Specifically, the method comprises precipitating of a metal halide or a metal oxide precursor in the presence of powders of the active metal oxide material. Then, after the initially coated powder is collected and dried, the coated lithium metal oxide composition is annealed at a temperature of at least about 250° C. The halides are heated in a substantially oxygen free environment, while oxide coatings generally are heated in an oxygen environment to convert the metal oxide precursors, e.g., carbonates or hydroxides, to the corresponding metal oxide coatings.

Additionally, suitable metal oxide coatings are described further, for example, in copending U.S. patent application 2011/0076556 to Karthikeyan et al. entitled "Metal Oxide Coated Positive Electrode Materials for Lithium-Based Batteries", incorporated herein by reference. The discovery of non-fluoride metal halides as desirable coatings for cathode active materials is described in copending U.S. patent application Ser. No. 12/888,131 to Venkatachalam et al., entitled "Metal Halide Coatings on Lithium Ion Battery Positive Electrode Materials and Corresponding Batteries," incorporated herein by reference. The synthesis approaches along with the coating provide for superior performance of the materials with respect to capacity as well as cycling properties.

Battery Structure

Referring to FIG. 1, a battery 100 is shown schematically having a negative electrode 102, a positive electrode 104 and a separator 106 between negative electrode 102 and positive electrode 104. A battery can comprise multiple positive electrodes and multiple negative electrodes, such as in a stack, with appropriately placed separators. Electrolyte, such as the desirable electrolytes described herein, in contact with the electrodes provides ionic conductivity through the separator between electrodes of opposite polarity. A battery generally comprises current collectors 108, 110 associated respectively with negative electrode 102 and positive electrode 104. The stack of electrodes with their associated current collectors and separator are generally placed within a container with the electrolyte. In general, the lithium ion battery described herein comprises a positive electrode comprising a lithium intercalation material and a lithium foil negative electrode.

The positive electrode active compositions generally are powder compositions that are held together in the electrode with a polymer binder. The binder provides ionic conductivity to the active particles when in contact with the electrolyte. Suitable polymer binders include, for example, polyvinylidine fluoride (PVDF), polyethylene oxide, polyimide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof. As described in the '707 application cited above, high molecular weight (e.g., at least about 800,000 AMU) PVDF is a particularly desirable polymer binder for the positive electrodes. Furthermore, thermally curable polyimide polymers have been found desirable for high capacity negative electrodes, which may be due to their high mechanical strength and high elongation prior to tearing.

Suitable negative electrode active material include, for example, graphite, synthetic graphite, coke, fullerenes, niobium pentoxide, tin alloys, silicon based materials, titanium oxide, tin oxide, and lithium titanium oxide, such as $Li_xTiO_2$, $0.5<x\leq1$ or $Li_{1+x}Ti_{2-x}O_4$, $0\leq x\leq 1/3$. Graphitic carbon materials are desirable due to established long term cycling stability, e.g., see the '756 application cited above. Silicon based materials can provide very high capacities for the negative electrode. High capacity silicon based materials include, for example, silicon alloys, silicon sub-oxide compositions, nanostructured silicon, porous silicon based material and the like. These compositions are described in published U.S. patent application 2009/0305131A to Kumar et al., entitled "High Energy Lithium Ion Batteries With Particular Negative electrode Compositions," U.S. patent application 2010/0119942 to Kumar et al. entitled "Composite Compositions, Negative Electrodes with Composite Compositions and Corresponding Batteries", U.S. patent application 2011/0111294 to Lopez et al. (the '294 application) entitled, "High Capacity Anode Materials for Lithium Ion Batteries", U.S. patent application Ser. No. 13/108,708 to Deng et al. (the '708 application) entitled, "Silicon oxide based high capacity anode materials for lithium ion batteries", all incorporated herein by reference.

The active particle loading in the binder can be large, such as greater than about 80 weight percent, in further embodiments at least about 83 weight percent and in other embodiments from about 85 to about 97 weight percent active material. A person of ordinary skill in the art will recognize that additional ranges of particles loadings within the explicit ranges about are contemplated and are within the present disclosure. To form the electrode, the powders can be blended with the polymer binder in a suitable liquid, such as a solvent for the polymer binder. The resulting paste can be pressed into the electrode structure.

The positive electrode composition, and in some embodiments the negative electrode composition, generally can also comprise an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, an electrode can comprise from about 1 weight percent to about 25 weight percent, and in further embodiments from about 2 weight percent to about 20 weight percent and in other embodiments from about 3 weight percent to about 15 weight percent distinct electrically conductive powder. A person of ordinary skill in the art will recognize that additional ranges of amounts of electrically conductive powders within the explicit ranges above are contemplated and are within the present disclosure.

Each electrode generally is associated with an electrically conductive current collector to facilitate the flow of electrons between the electrode and an exterior circuit. A current collector can comprise a metal structure, such as a metal foil or a metal grid. In some embodiments, a current collector can be formed from nickel, aluminum, stainless steel, copper or the like. An electrode material can be cast as a thin film onto a current collector. The electrode material with the current collector can then be dried, for example in an oven, to remove solvent from the electrode. In some embodiments, a dried electrode material in contact with a current collector foil or other structure can be subjected to a pressure from about 2 to about 10 $kg/cm^2$ (kilograms per square centimeter).

The separator is located between the positive electrode and the negative electrode. The separator is electrically insulating while providing for at least selected ion conduction between the two electrodes. A variety of materials can be used as separators. Commercial separator materials can be formed from polymers, such as polyethylene and/or polypropylene that are porous sheets that provide for ionic conduction. Commercial polymer separators include, for example, the Celgard® line of separator material from Hoechst Celanese, Charlotte, N.C. Suitable separator materials include, for example, 12 micron to 40 micron thick trilayer polypropylene-polyethylene-polypropylene sheets, such as Celgard® M824, which has a thickness of 12 microns. Also, ceramic-polymer composite materials have been developed for separator applications. These composite separators can be stable at higher temperatures, and the composite materials can significantly reduce the fire risk. The polymer-ceramic composites for separator materials are described further in U.S. Pat. No. 7,351,494 to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

The electrolyte provides for ion transport between the anode and cathode of the battery during the charge and discharge processes. We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl)methide, lithium tetrafluoroborate, lithium perchlorate, lithium tetrachloroaluminate, lithium chloride, lithium difluoro oxalato borate, and combinations thereof. In some embodiments, the electrolyte comprises a 1 M concentration of the lithium salts, although greater or lesser concentrations can be used.

For lithium ion batteries of interest, a non-aqueous liquid is generally used to dissolve the lithium salt(s). The solvent generally does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formunamide, dimethyl formamide, triglyme (tri(ethylene glycol) dimethyl ether), diglyme (diethylene glycol dimethyl ether), DME (glyme or 1,2-dimethyloxyethane or ethylene glycol dimethyl ether), nitromethane and mixtures thereof. Particularly useful solvents for high voltage lithium-ion batteries are described further in copending U.S. patent applications 2011/0136019 to Amiruddin et al. entitled: "Lithium ion battery with high voltage electrolytes and additives", incorporated herein by reference.

Electrolyte with fluorinated additives has shown to further improve the battery performance for batteries with silicon based negative electrode active material. The fluorinated additives can include, for example, fluoroethylene carbonate, fluorinated vinyl carbonate, monochloro ethylene carbonate, monobromo ethylene carbonate, 4-(2,2,3,3-tetrafluoropropoxymethyl)-[1,3]dioxolan-2-one, 4-(2,3,3,3-tetrafluoro-2-trifluoro methyl-propyl)-[1,3]dioxolan-2-one, 4-trifluoromethyl-1,3-dioxolan-2-one, bis(2,2,3,3-tetrafluoro-propyl)carbonate, bis(2,2,3,3,3-pentafluoro-propyl)carbonate, or mixtures thereof.

The lithium metal oxide positive electrode materials described herein can be assembled with appropriate negative electrode materials into various commercial battery designs such as prismatic shaped batteries, wound cylindrical batteries, coin cell batteries, or other reasonable battery shapes. The batteries can comprise a single pair of electrodes or a plurality of pairs of electrodes assembled in parallel and/or series electrical connection(s). While the materials described herein can be used in batteries for primary, or single charge use, the resulting batteries generally have desirable cycling properties for secondary battery use over multiple cycling of the batteries.

In some embodiments, the positive electrode and negative electrode can be stacked with the separator between them, and the resulting stacked structure can be rolled into a cylindrical or prismatic configuration to form the battery structure. Appropriate electrically conductive tabs can be welded or the like to the current collectors, and the resulting jellyroll structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used, as well as prismatic cells and foil pouch batteries of selected sizes.

Pouch cell batteries can be particularly desirable for vehicle applications due to stacking convenience and relatively low container weight. A desirable pouch battery design for vehicle batteries incorporating a high capacity cathode active materials is described in detail in copending U.S. patent applications 2009/0263707 to Buckley et al, entitled "High Energy Lithium Ion Secondary Batteries" and Ser. No. 13/195,672 to Kumar et al. (the '672 application), entitled "Battery Packs for Vehicles and High Capacity Pouch Secondary Batteries for Incorporation into Compact Battery Packs," both incorporated herein by reference. While the pouch battery designs are particularly convenient for use in specific battery pack designs, the pouch batteries can be used effectively in other contexts as well with high capacity in a convenient format.

A representative embodiment of a pouch battery is shown in FIGS. 2(a) to 2(c). In this embodiment, pouch battery 160 comprises pouch enclosure 162, battery core 164 and pouch cover 166. Pouch enclosure 162 comprises a cavity 170 and edge 172 surrounding the cavity. Cavity 170 has dimensions such that battery core 164 can fit within cavity 170. Pouch cover 166 can seal around edge 172 to seal battery core 164 within the sealed battery, as shown in FIGS. 2(b) and 2(c). Referring to FIG. 2(b), the pouch enclosure 162 is sealed with the pouch cover 166 along edge 172 to form the pouch battery 160. Terminal tabs 174, 176 extend outward from the sealed pouch for electrical contact with battery core 164. FIG. 2(c) is a schematic diagram of a cross section of the battery of FIG. 2(b) viewed along the A-A line. Specifically, battery core 164 is shown to be encased inside the cavity 170 of the pouch enclosure 162 sealed along the edge 172 with pouch cover 166 to form the pouch battery 160. Many additional embodiments of pouch batteries are possible with different configurations of the edges and seals.

Performance

In general, various appropriate testing procedures can be used to evaluate the performance of the battery. The lithium metal oxide (LMO) material can be formed into a positive electrode and tested against a lithium foil electrode to evaluate the capacity and the irreversible capacity loss (IRCL). The IRCL is the difference between the first cycle charge capacity and the first cycle discharge capacity. The first cycle capacities of a cell with a lithium foil counter electrode can be used to evaluate the irreversible capacity loss (IRCL) of the positive electrode.

The positive electrode can alternatively be cycled against a suitable negative electrode since then the battery thus formed can be cycled over appropriate voltage ranges for cycling in a more suitable commercial battery format. Suitable testing procedures are described in more detail in the examples below. Specifically, the battery can then be cycled between 4.6 volts and 1.0 volt at room temperature at C/10, C/5, C/3, 1C, and 2C rates. The specific discharge capacity of a battery or electrode is significantly dependent on the discharge rate. The notation C/x implies that the battery is discharged at a rate to fully discharge the battery to the selected voltage minimum in x hours. Batteries formed with LMO material described herein have demonstrated good performance at reasonable cycling rates and excellent cycling properties with respect to both capacity and average voltage.

The layered-layered-spinel LMO compositions described herein exhibit relatively good cycling with respect to specific capacity and average voltage following an initial number of charge discharge cycles when cycled with a lithium foil negative electrode. Specifically, the specific capacity at 75 cycles can be at least about 85% of the specific capacity at cycle 25 and in further embodiments at least about 88%, in other embodiments at least about 90% and in additional embodiments at least about 92% of the specific capacity at the 25 cycle when discharged at a rate of C/3 from 4.6V to 2V. The specific capacity can be at least 125 mAh/g, in further embodiments at least about 140 mAh/g and in additional embodiments at least about 150 mAh/g at cycle 25 when discharged at a rate of C/3 from 4.6V to 2V. The average voltage values exhibit similar cycling stability. Specifically, the average voltage at the 75th cycle can be at least about 88% of the average voltage at cycle 25, in further embodiments at least about 90%, and in additional embodiments at least about 92% of the average at the 25th cycle when discharged at a rate of C/3 from 4.6V to 2V. The average voltage at the 75th cycle at a discharge rate of C/3 generally is at least 3V. A person of ordinary skill in the art will recognize that additional ranges of specific capacity and average voltage within the explicit ranges above are contemplated and are within the present disclosure.

EXAMPLES

Lithium metal oxide (LMO) electrode materials with various stoichiometry compositions were tested in batteries to evaluate their performance. These LMO materials may be somewhat lithium rich or somewhat lithium deficient. Generally, the LMO materials were formed into positive electrodes that are assembled into coin cells with lithium foil as the counter negative electrode to test the performance of the materials with respect to voltage and capacity retention over long cycling numbers. The general procedure for formation of the coin cell batteries is described in the following discussion and the examples below to describe the synthesis of the LMO materials and the performance results from batteries formed from the LMO materials. The batteries described herein in general were cycled by charging and discharging between 4.6V and 2V against a lithium foil negative electrode.

The LMO materials were synthesized as powder form using the solid phase procedure outlined in the examples below. Electrodes were formed from the synthesized LMO powder by initially mixing it thoroughly with conducting carbon black (Super P™ from Timcal, Ltd, Switzerland) and graphite (KS 6™ from Timcal, Ltd) to form a homogeneous powder mixture. Separately, Polyvinylidene fluoride PVDF (KF1300™ from Kureha Corp., Japan) was mixed with N-methyl-pyrrolidone (Sigma-Aldrich) and stirred overnight to form a PVDF-NMP solution. The homogeneous powder mixture was then added to the PVDF-NMP solution and mixed for about 2 hours to form homogeneous slurry. The slurry was applied onto an aluminum foil current collector to form a thin, wet film and the laminated current collector was dried in vacuum oven at 110° C. for about two hours to remove NMP. The laminated current collector was then pressed between rollers of a sheet mill to obtain a desired lamination thickness. The dried electrode comprised at least about 75 weight percent active metal oxide, at least about 3 weight percent carbon black, and at least about 2 weight percent polymer binder. The electrodes were then placed inside an argon filled glove box for the fabrication of the coin cell batteries.

Lithium foil (FMC Lithium) having thickness of roughly 125 micron was used as a negative electrode. An electrolyte was selected to be stable at high voltages, and appropriate electrolytes are described in published U.S. patent application 2011/0136019 to Amiruddin et al., entitled "Lithium Ion Battery With High Voltage Electrolytes and Additives," incorporated herein by reference. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles.

Example 1

Synthesis of the Layered-layered-spinel Material

Acetate salt of transition metals $Co(CH_3COO)_2 \cdot 4H_2O$, $Mn(CH_3COO)_2 \cdot 4H_2O$, $Ni(CH_3COO)_2 \cdot 4H_2O$ were powdered by mortar and pestle and mixed together with similarly powdered $LiCH_3COO \cdot 2H_2O$ to form a reaction mixture. The amount of each transition metal acetate salt as well as the lithium acetate used was predetermined to produce a product of a specific stoichiometry. The mixture was dry mixed for 3 hours before being subjected to a two stage heating process with the first stage heating at about 400° C. for 10 h in dry air, followed by grinding, sieving to collect the fine powder. The fine powder was again heated at about 850° C. for 24 h in dry air followed by grinding, sieving to form the final Layered-layered-spinel material in powder form with desired metal stoichiometry. The material formed was then subjected to X-ray analysis and electrochemical performance evaluations.

Example 2

Figure 3:
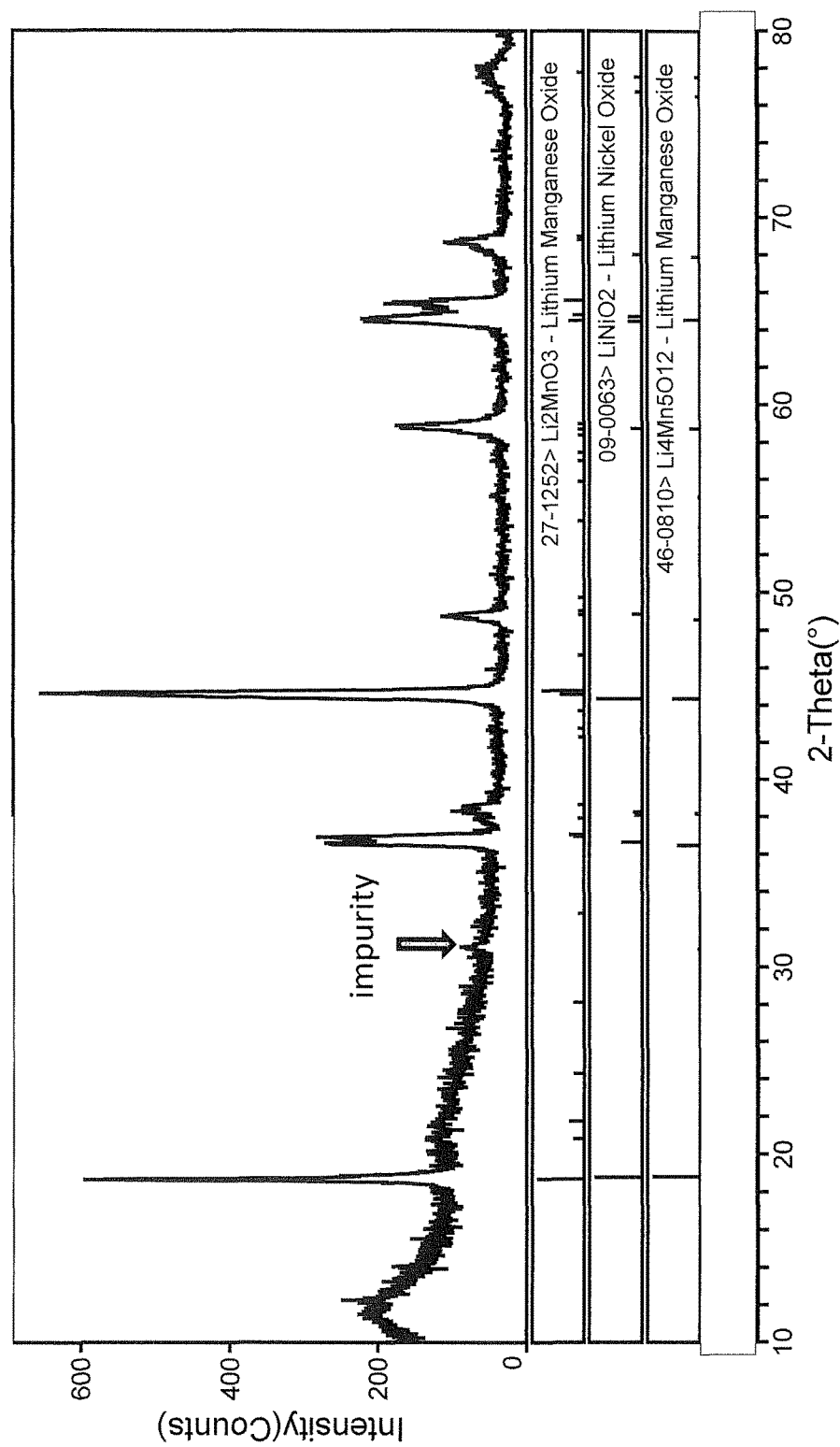
FIG. 3 is a plot x-ray diffractogram of the lithium rich material of example 2.
Figure 4:
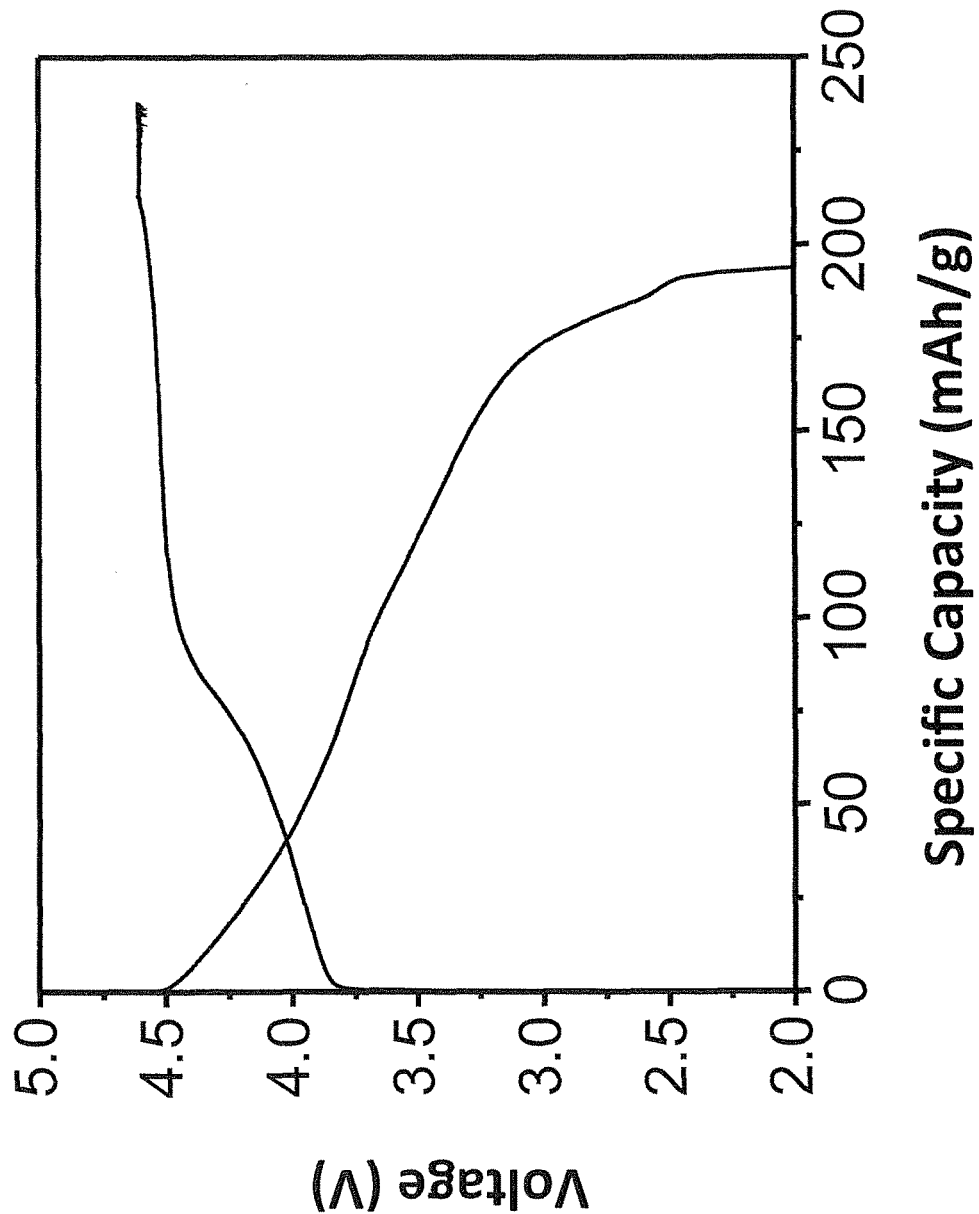
FIG. 4 is a plot of first cycle charge and discharge capacity of the battery of example 2 between 4.6 V and 2.0V.
Figure 5:
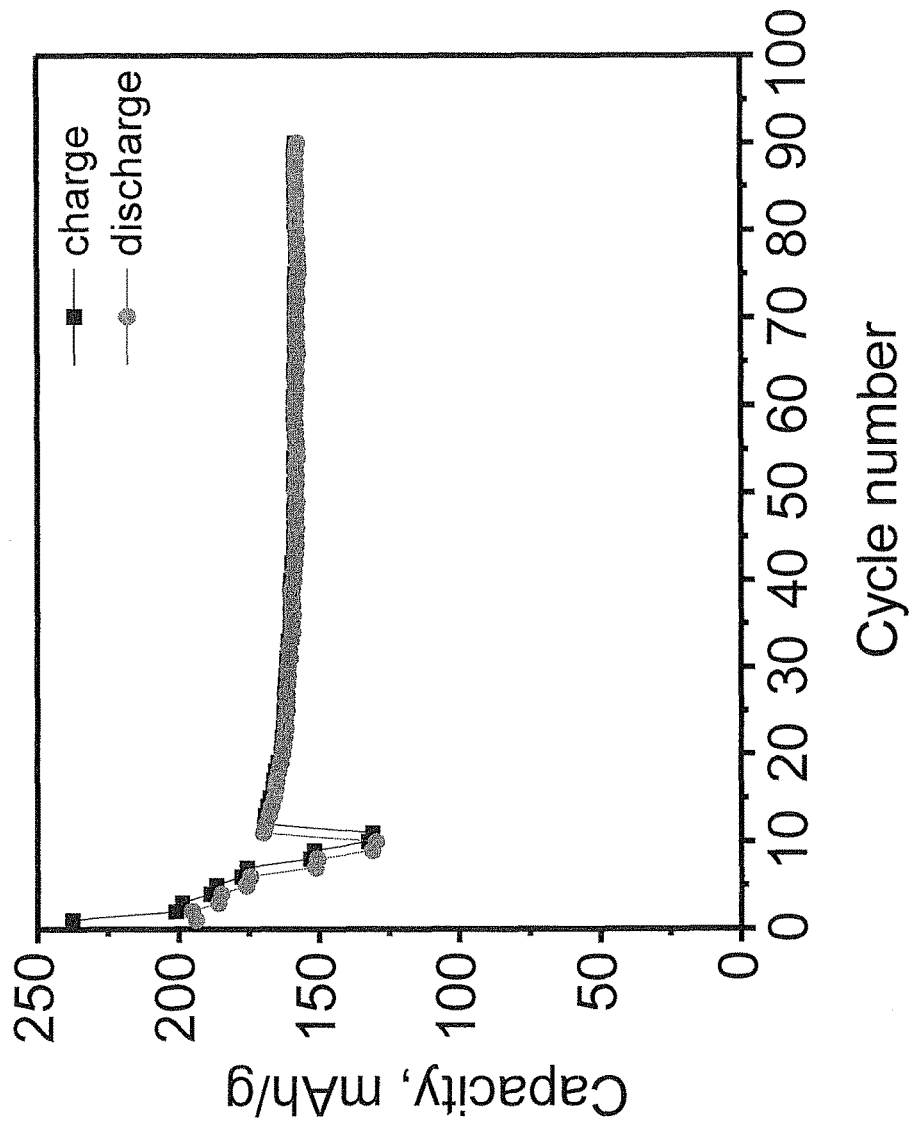
FIG. 5 is plot of capacity versus cycle number of the battery of example 2 cycled out to 90 cycles.
Figure 6:
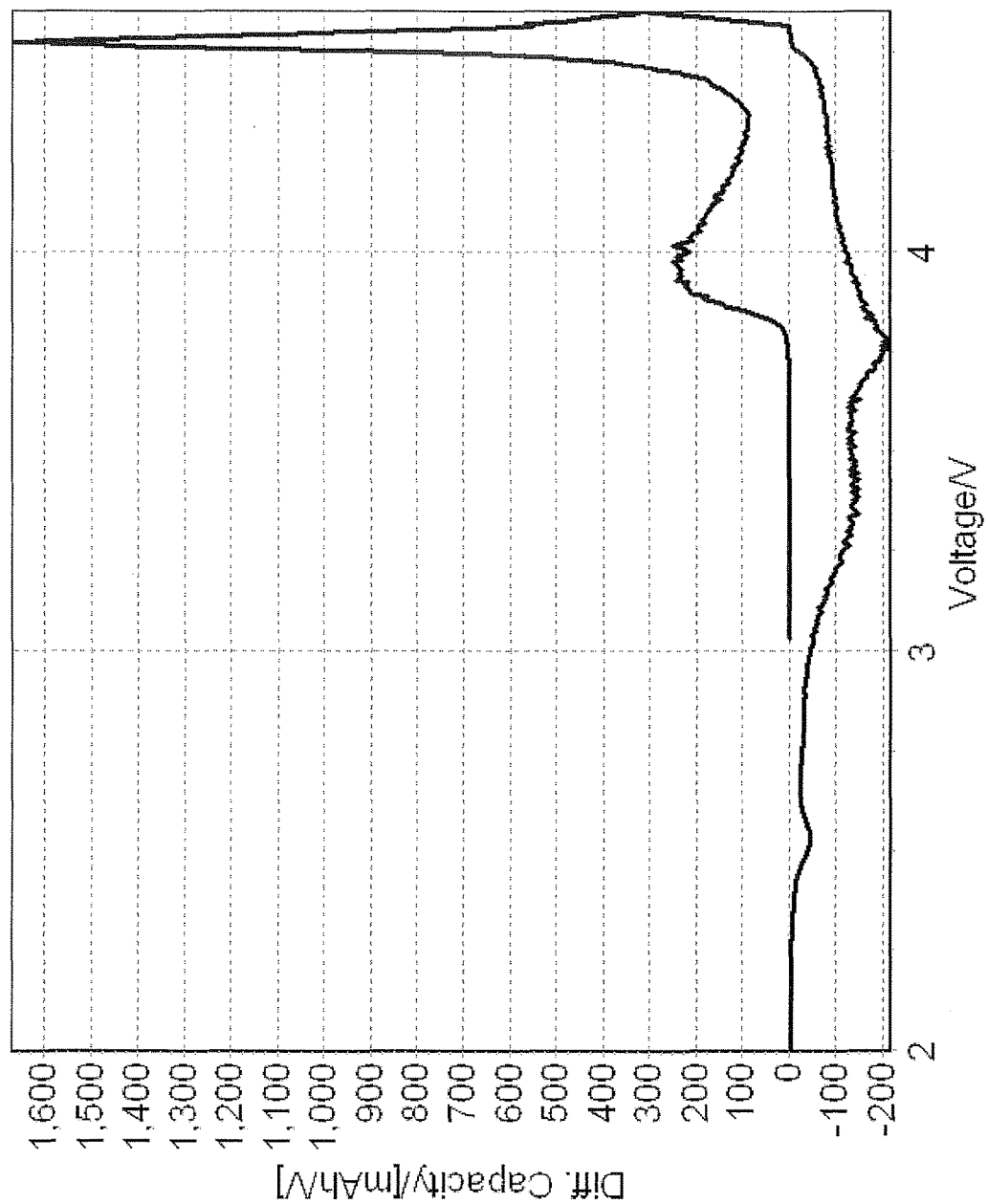
FIG. 6 is plot of the first cycle charge and discharge differential capacity of the battery of example 2 between 4.6 V and 2.0V.

Evaluations of Material with Formula $Li_{1.1}Co_{0.25}Ni_{0.1875}Mn_{0.5625}O_{2+\delta}$ Specifically, lithium rich material with formula $Li_{1.1}Co_{0.25}Ni_{0.1875}Mn_{0.5625}O_{2+\delta}$ was formed using the method outlined above. X-ray diffractograms of this lithium rich material has been taken and plotted in FIG. 3, showing small amount of impurities along with major peaks from $LiNiO_2$, $Li_4Mn_5O_{12}$-like, and $Li_2MnO_3$ phases indicating a layered-layered-spinel structure. The "impurity" phase is believed to be an inactive $Co_3O_4$ phase. The material was then assembled into a battery with a lithium foil negative electrode following the procedures outlined above. The battery was cycled between 4.6 V to 2.0 V at C/10 for cycles 1 and 2, at C/5 for cycles 3 and 4, at C/3 for cycles 5 and 6, at 1C for cycles 7 and 8, at 2C for cycles 9 and 10, and at C/3 for subsequent cycles. FIG. 4 shows the first cycle charge and discharge capacity of the battery between 4.6 V and 2.0V. As shown in FIG. 4, the first cycle charge capacity of the battery is about 237.5 mAh/g while the discharge capacity is about 193.8 mAh/g. The irreversible capacity loss of the battery therefore is about 43.7 mAh/g, about 18.4% of the total battery capacity. FIG. 5 shows the cycling performance of the battery out to 90 cycles. As shown in FIG. 5, the battery appears to maintain above 150 mAh/g capacity out to 90 cycles although a significant decrease of capacity was observed when the battery was cycled at high cycling rates between cycles 7 and 10. FIG. 6 shows the first cycle charge and discharge differential capacity of the battery between 4.6 V and 2.0V. The charge plot suggests two active phases, and the discharge plot suggests three active phases including a phase active at a voltage below 3 V. FIG.

Figure 7:
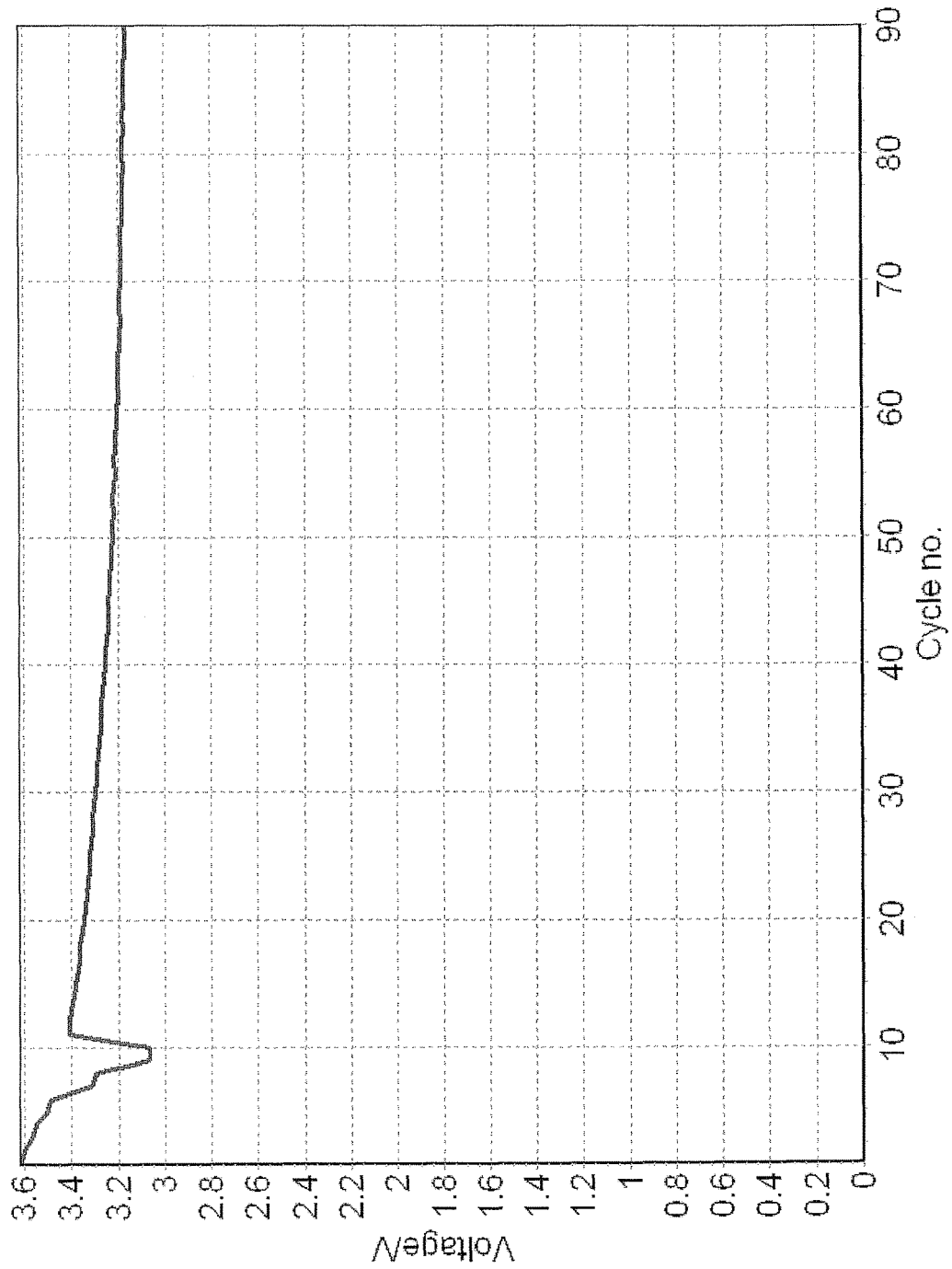
FIG. 7 is plot of voltage versus cycle number of the battery of example 2 cycled out to 90 cycles.

7 shows the voltage performance of the battery out to 90 cycles. As shown in FIG. 7, the battery appears to maintain above 3.1 V out to 90 cycles although a significant decrease of voltage was observed when the battery was cycled at high cycling rates between cycles 7 and 10.

Example 3

Figure 8:
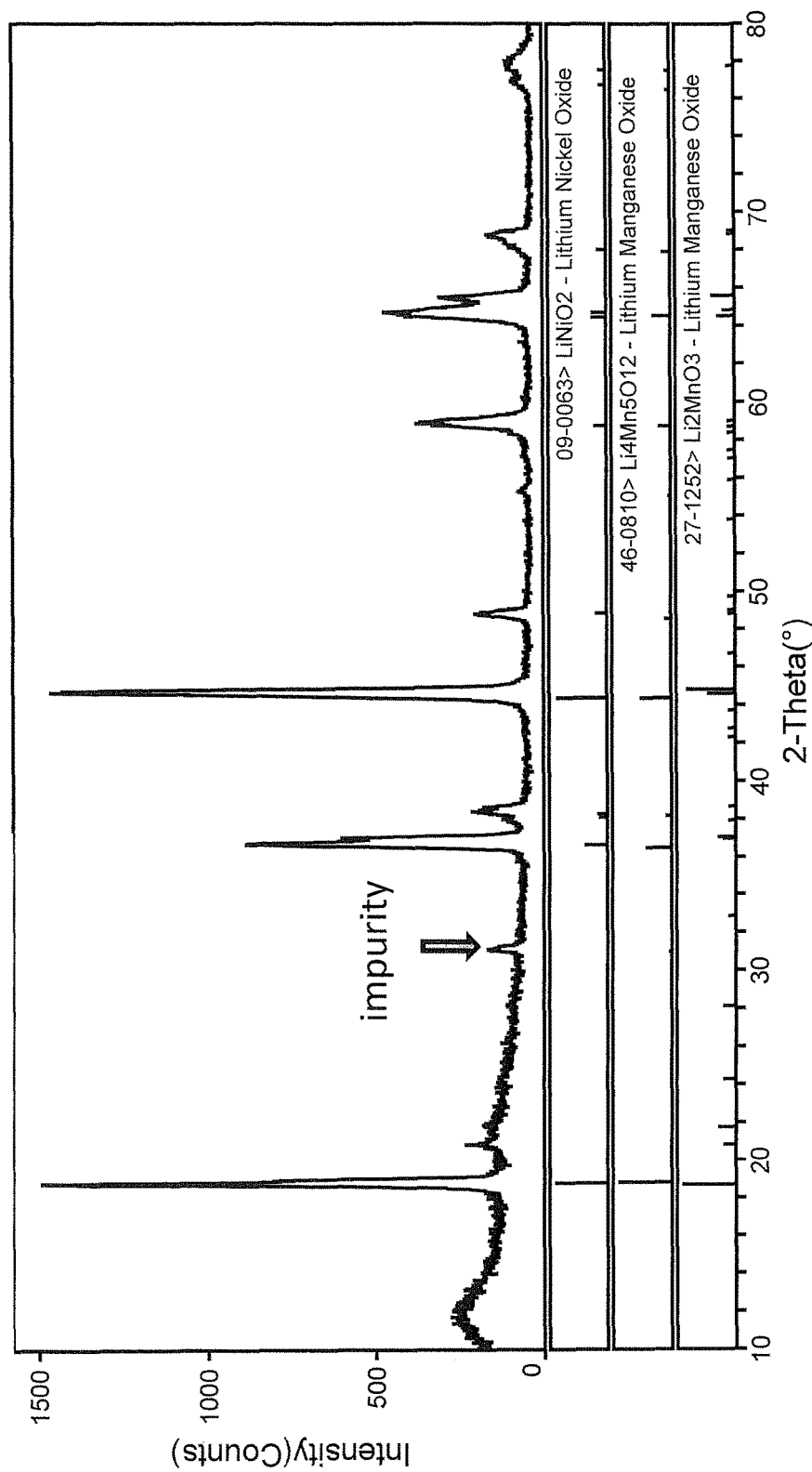
FIG. 8 a plot x-ray diffractogram of the lithium rich material of example 3.
Figure 9:
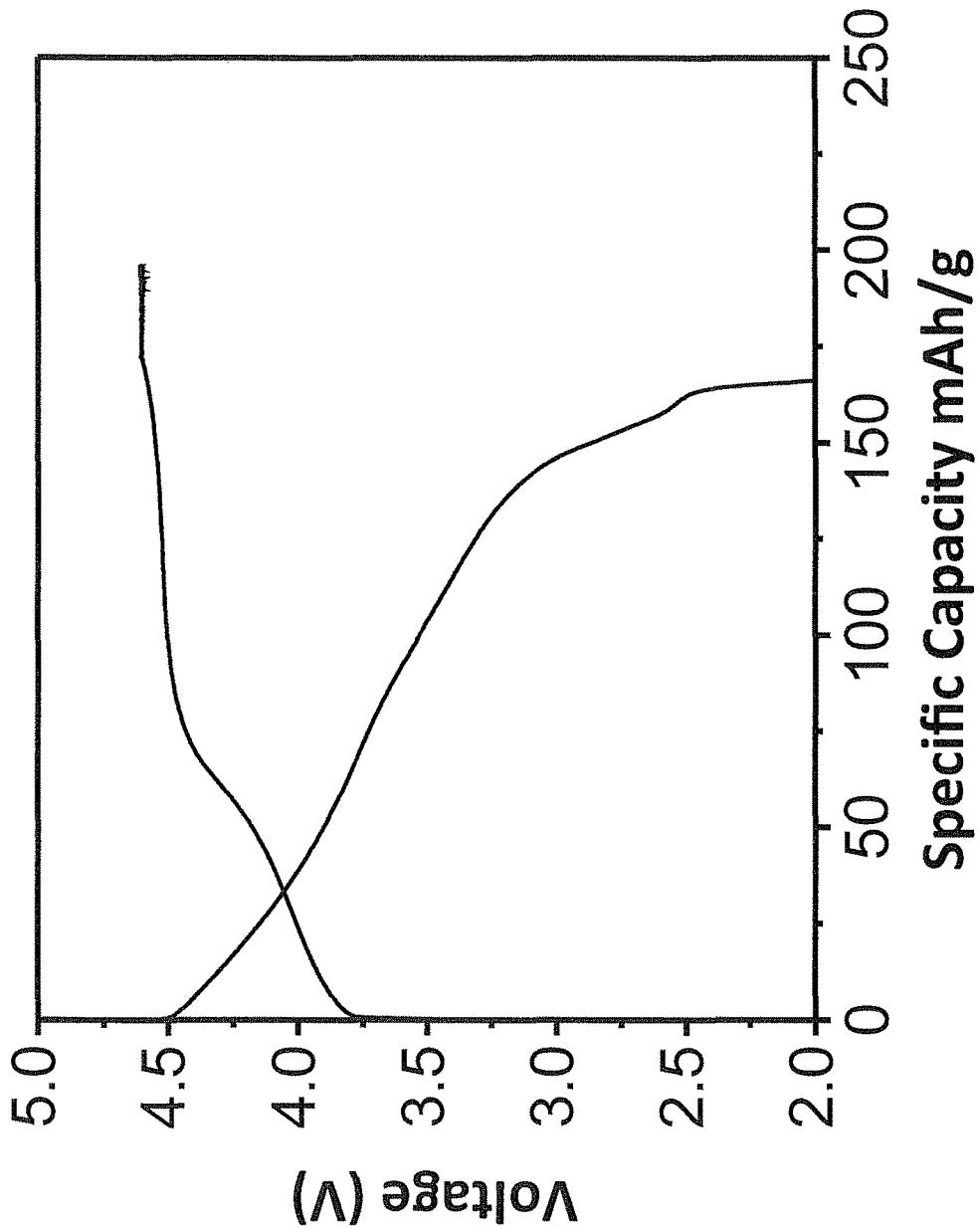
FIG. 9 is a plot of first cycle charge and discharge capacity of the battery of example 3 between 4.6 V and 2.0V.
Figure 11A:
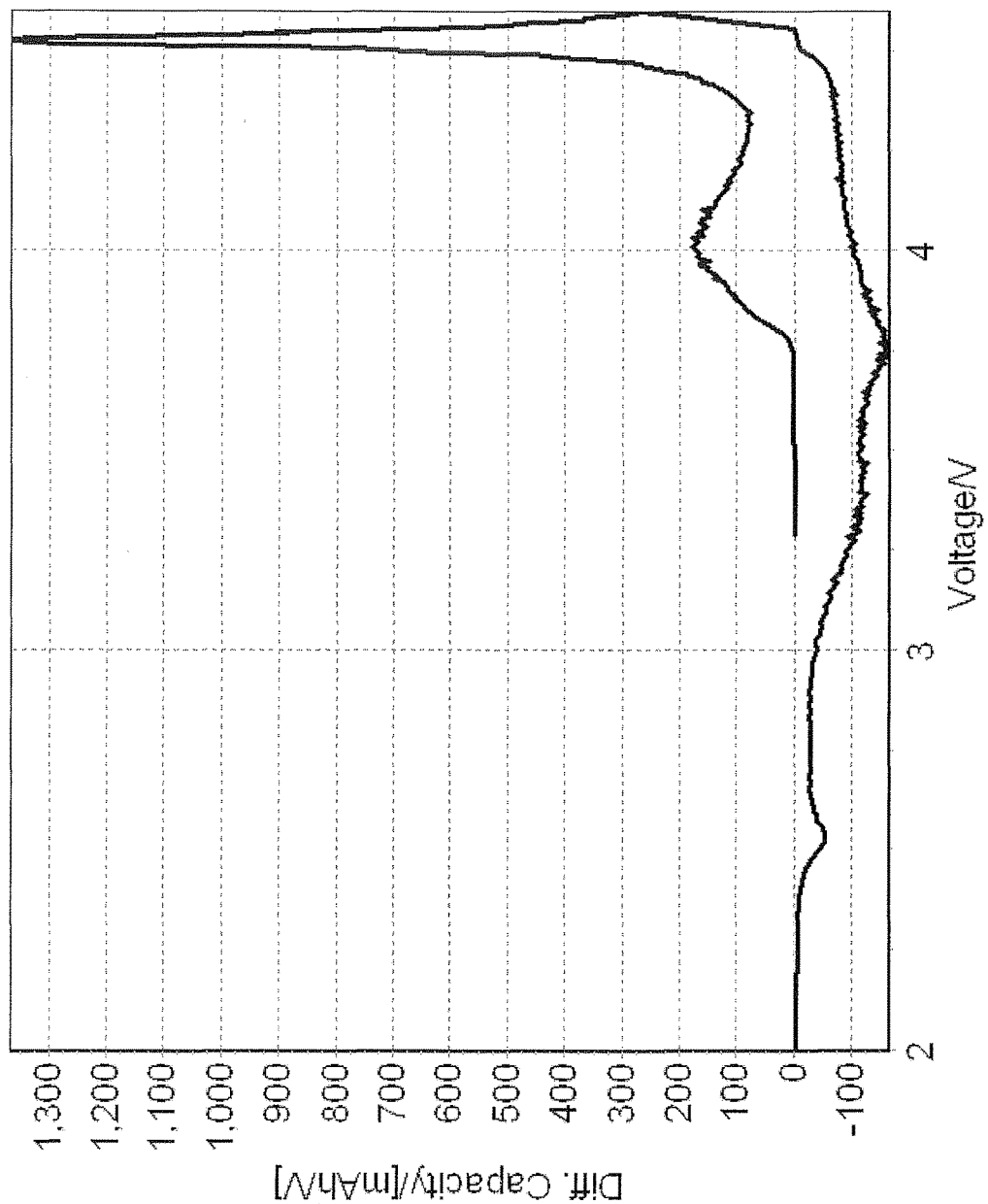
FIG. 11A is plot of the first cycle charge and discharge differential capacity of the battery of example 3 between 4.6 V and 2.0V.
Figure 11B:
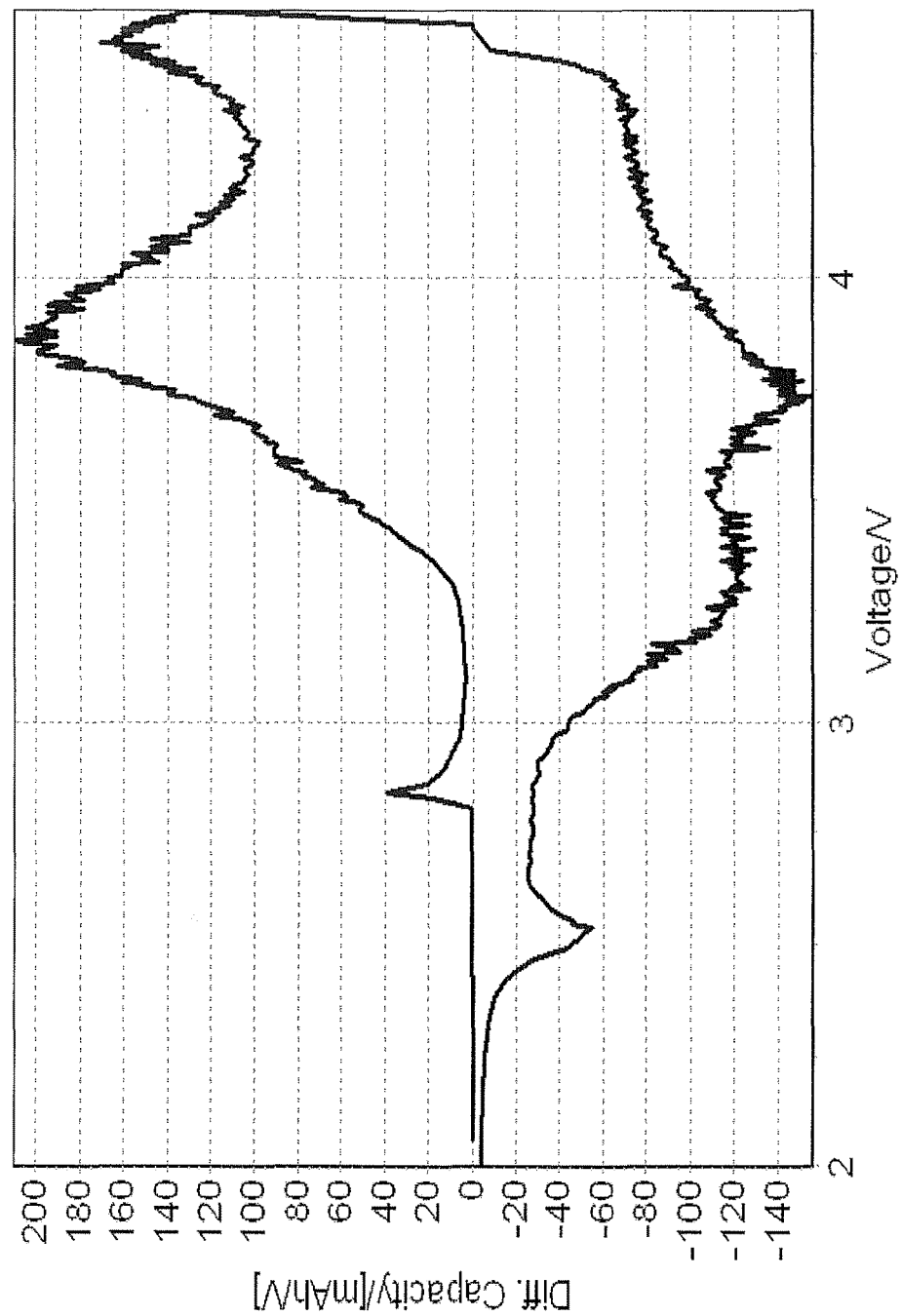
FIG. 11B is plot of the second cycle charge and discharge differential capacity of the battery of example 3 between 4.6 V and 2.0V.
Figure 12:
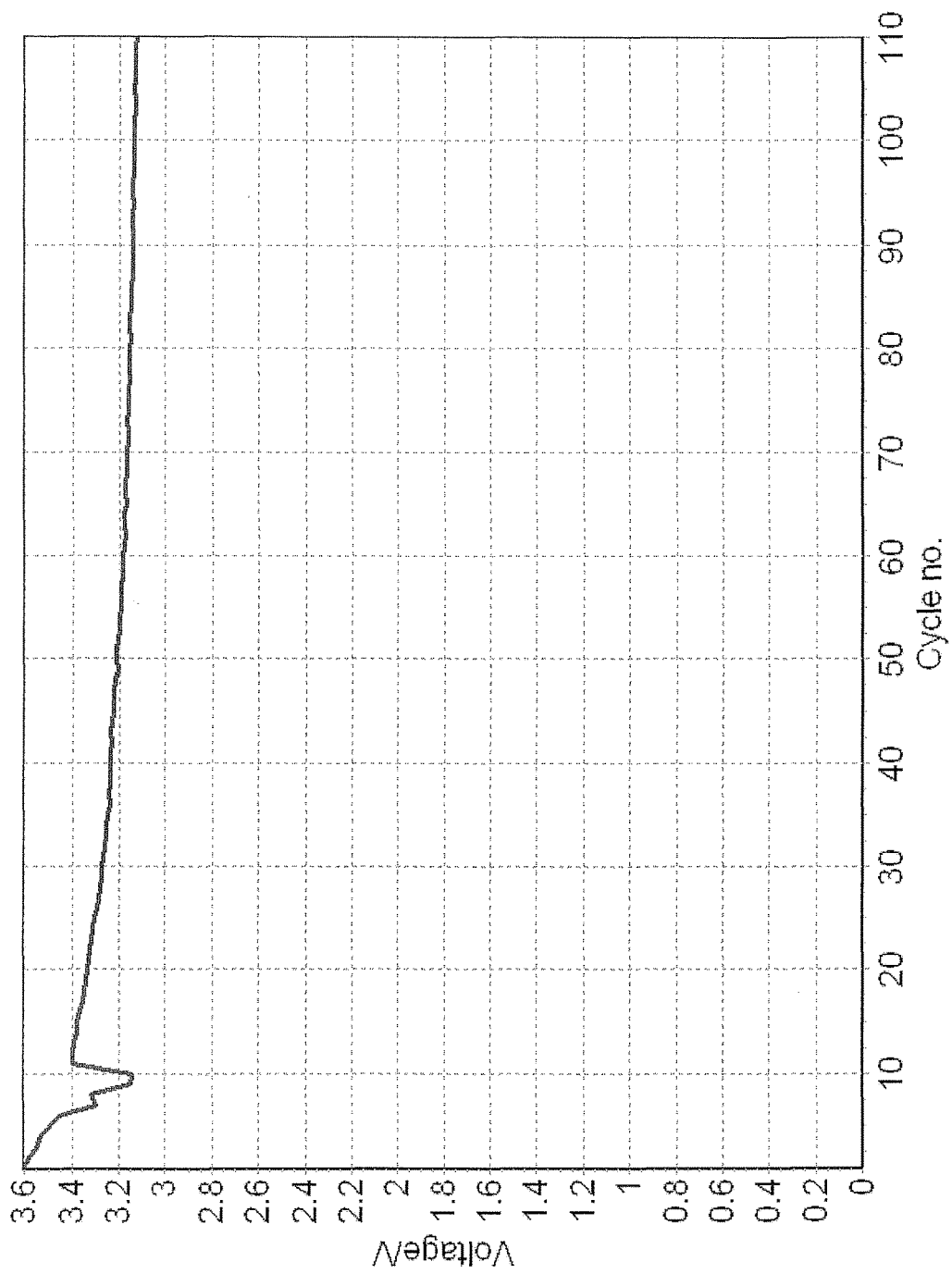
FIG. 12 is plot of voltage versus cycle number of the battery of example 3 cycled out to 110 cycles.

Evaluations of Material with Formula
$Li_1Co_{0.25}Ni_{0.1875}Mn_{0.5625}O_{2+\delta}$ Lithium metal oxide active material with formula $Li_1Co_{0.25}Ni_{0.1875}Mn_{0.5625}O_{2+\delta}$ was formed using the method outlined above. X-ray diffiractograms of this lithium metal oxide active material has been taken and plotted in FIG. 8, showing small amount of impurities along with major peaks from $LiNiO_2$, $Li_4Mn_5O_{12}$-like, and $Li_2MnO_3$ phases indicating a layered-layered-spinel structure. The material was then assembled into a battery with a lithium foil negative electrode following the procedures outlined above. The battery was cycled between 4.6 V to 2.0 V at C/10 for cycles 1 and 2, at C/5 for cycles 3 and 4, at C/3 for cycles 5 and 6, at 1C for cycles 7 and 8, at 2C for cycles 9 and 10, and at C/3 for subsequent cycles. FIG. 9 shows the first cycle charge and discharge capacity of the battery between 4.6 V and 2.0V. As shown in FIG. 9, the first cycle charge capacity of the battery is about 200 mAh/g while the discharge capacity is about 165 mAh/g. The irreversible capacity loss of the battery therefore is about 35 mAh/g, about 17.5% of the total battery capacity. FIG. 10 shows the cycling performance of the battery out to 110 cycles. As shown in FIG. 10, the battery appears to maintain above 135 mAh/g capacity out to 110 cycles although a decrease of capacity was observed when the battery was cycled at high cycling rates between cycles 7 and 10. FIGS. 11A and B shows the first cycle (A) and the second cycle (B) charge and discharge differential capacity of the battery between 4.6 V and 2.0V. The first cycle plots suggest two active phases during the first charge and three active phases during discharge. The second cycle charge plot shows significant changes relative to the first cycle, and the results suggest three active phases. The second cycle discharge plot is similar to the first cycle discharge plot. The second cycle contributions to the differential capacity near and below 3 V suggest contributions from a $Li_4Mn_5O_{12}$ spinel phase. FIG. 12 shows the voltage performance of the battery out to 110 cycles. As shown in FIG. 12, the battery appears to maintain above 3.1 V out to 110 cycles although a decrease of voltage was observed when the battery was cycled at high cycling rates between cycles 7 and 10.

These batteries show nicely flat capacities and average voltages after under going roughly 25 cycles. These results suggest very good cycling stability with moderately high capacity that seems likely to extend to significantly larger cycle numbers.

Example 4

Figure 13:
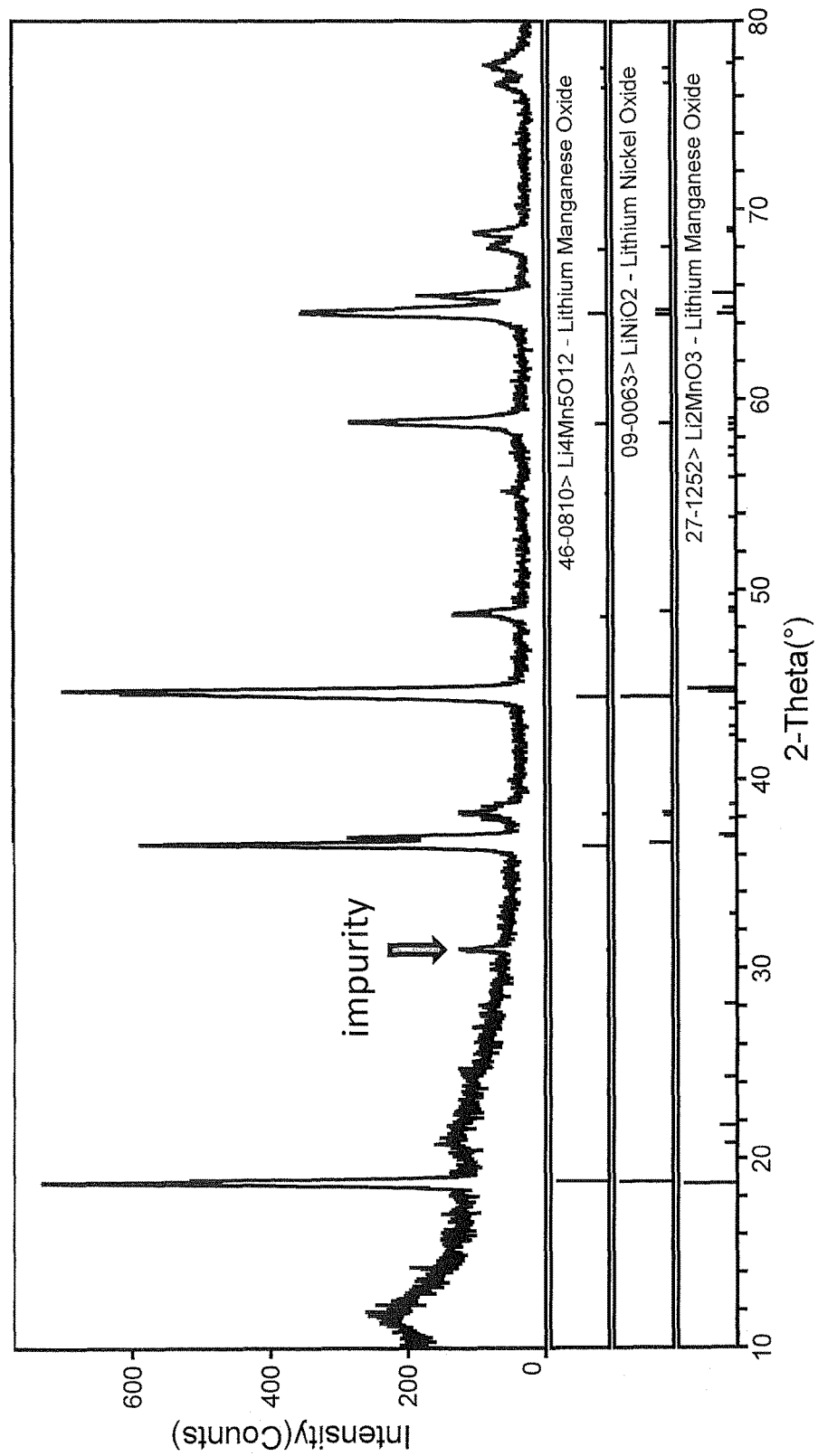
FIG. 13 is a plot x-ray diffractogram of the lithium rich material of example 4.
Figure 14:
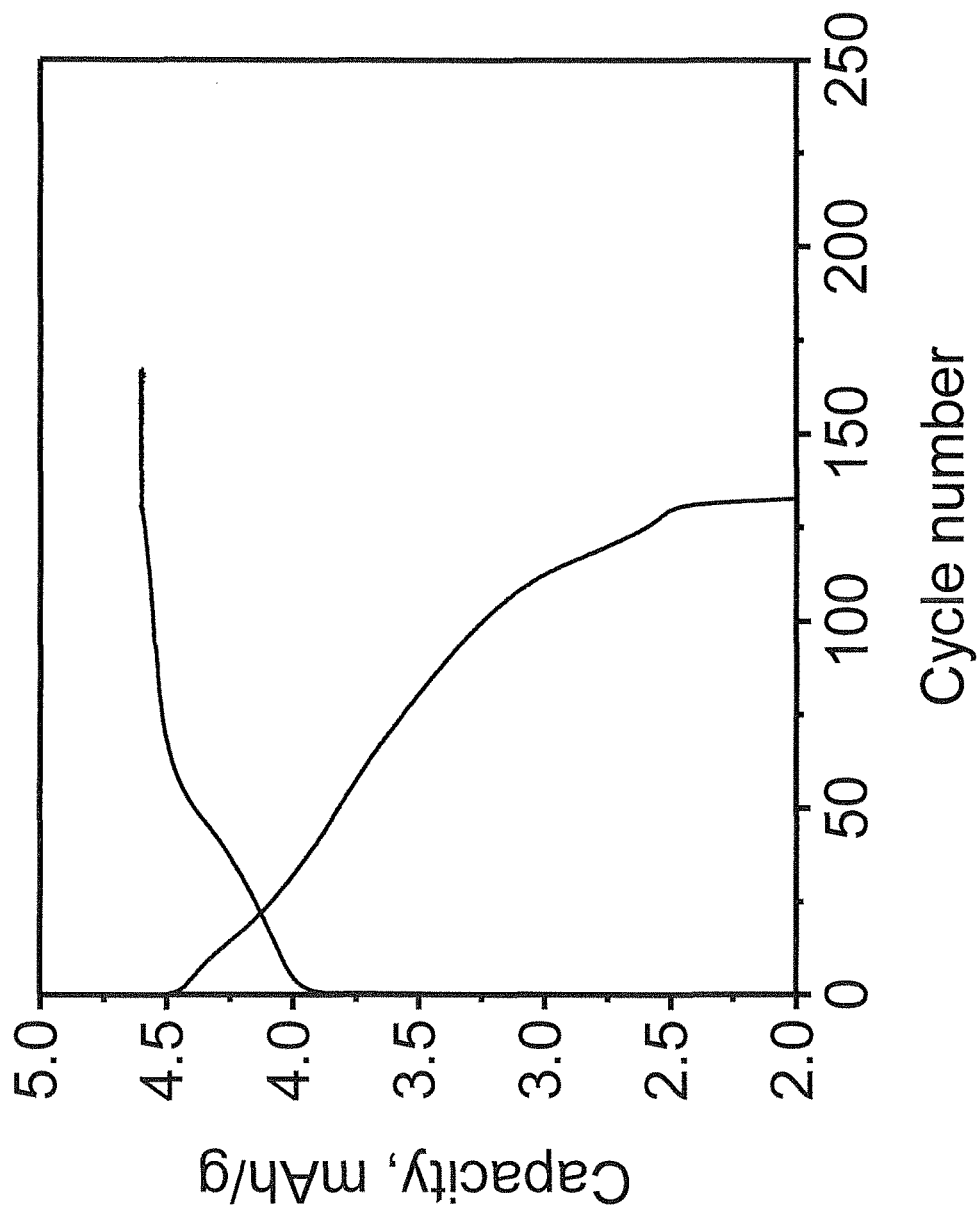
FIG. 14 is a plot of first cycle charge and discharge capacity of the battery of example 4 between 4.6 V and 2.0V.
Figure 15:
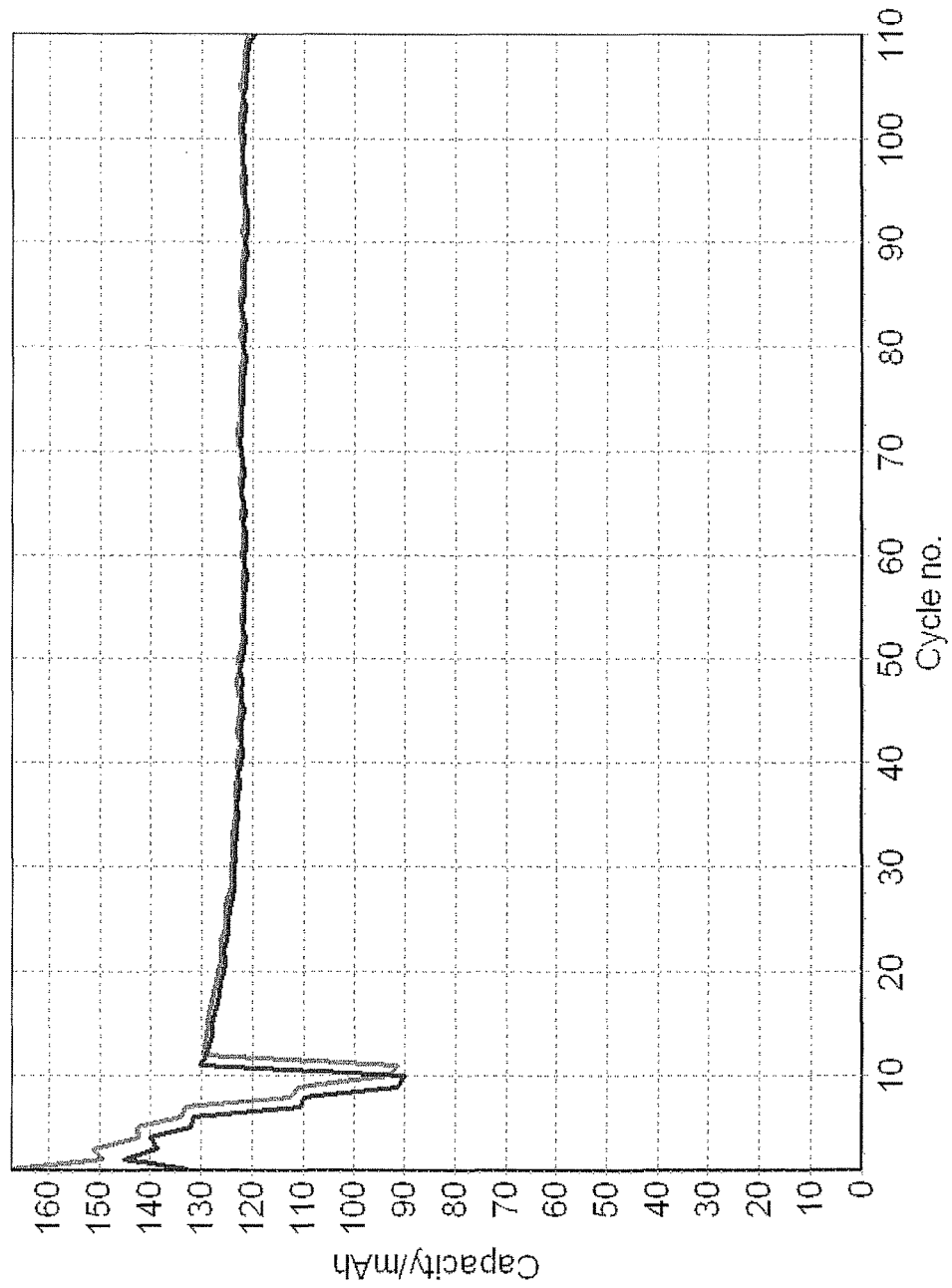
FIG. 15 is plot of capacity versus cycle number of the battery of example 4 cycled out to 110 cycles.
Figure 16:
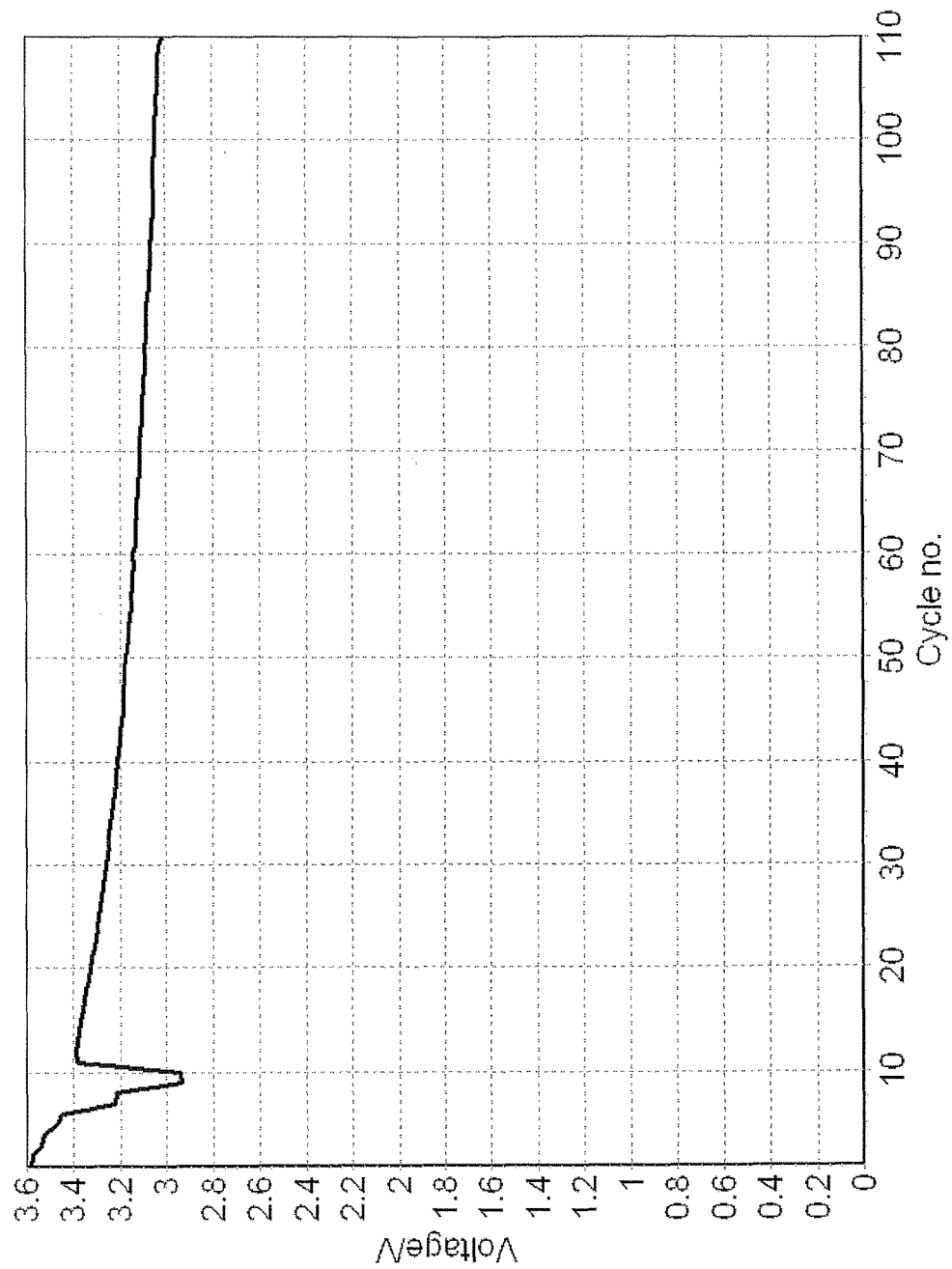
FIG. 16 is plot of voltage versus cycle number of the battery of example 4 cycled out to 110 cycles.
Figure 17B:
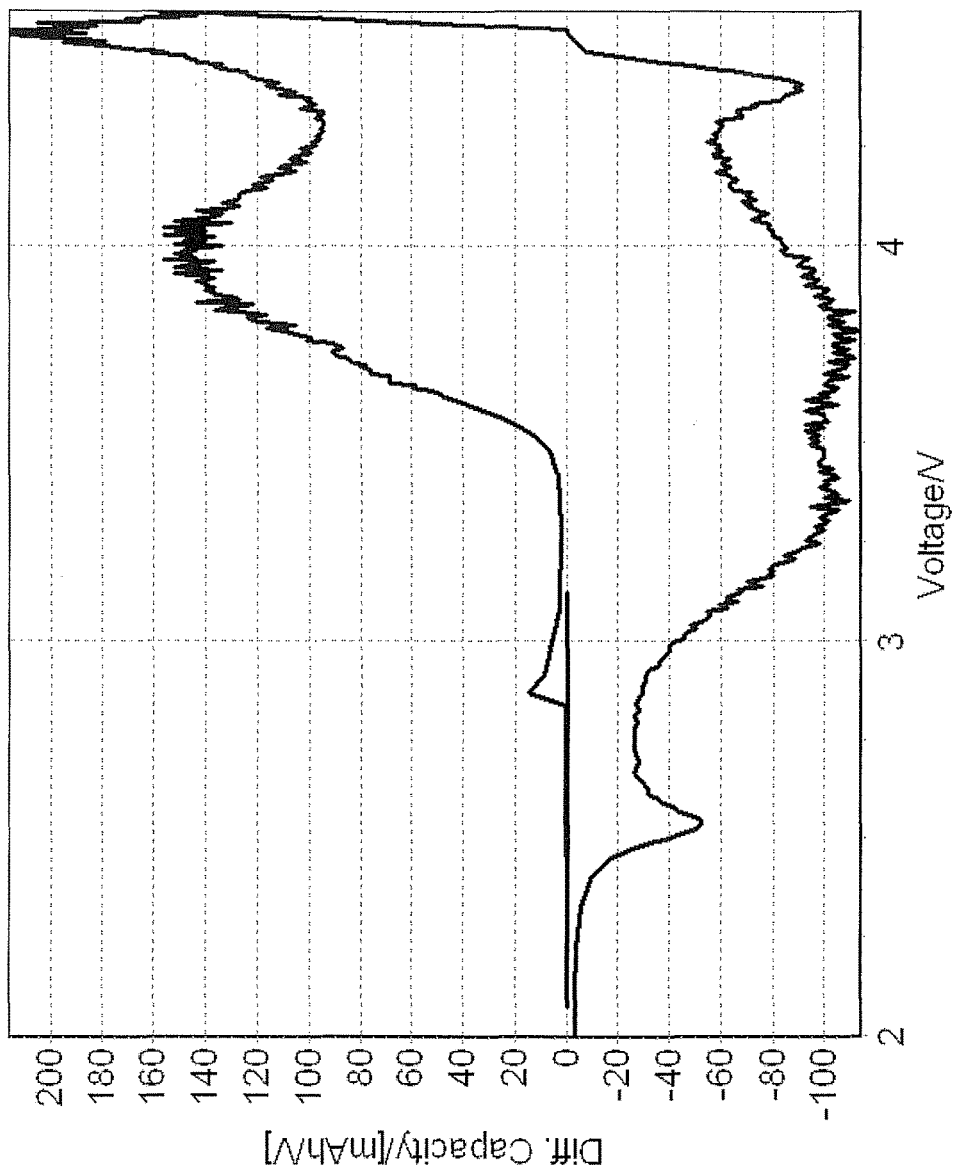
FIG. 17B is plot of the second cycle charge and discharge differential capacity of the battery of example 4 between 4.6 V and 2.0V.

Evaluations of Material with Formula
$Li_{0.9}Co_{0.25}Ni_{0.1875}Mn_{0.5625}O_{2+\delta}$ Lithium metal oxide active material with formula $Li_{0.9}Co_{0.25}Ni_{0.1875}Mn_{0.5625}O_{2+\delta}$ was formed using the method outlined above. X-ray diffractograms of this lithium metal oxide active material has been taken and plotted in FIG. 13, showing small amount of impurities along with major peaks from $LiNiO_2$, $Li_4Mn_5O_{12}$-like, and $Li_2MnO_3$ phases indicating a layered-layered-spinel structure. The material was then assembled into a battery with a lithium foil negative electrode following the procedures outlined above. The battery was cycled between 4.6 V to 2.0 V at C/10 for cycles 1 and 2, at C/5 for cycles 3 and 4, at C/3 for cycles 5 and 6, at 1C for cycles 7 and 8, at 2C for cycles 9 and 10, and at C/3 for subsequent cycles. FIG. 14 shows the first cycle charge and discharge capacity of the battery between 4.6 V and 2.0V. As shown in FIG. 14, the first cycle charge capacity of the battery is about 170 mAh/g while the discharge capacity is about 135 mAh/g. The irreversible capacity loss of the battery therefore is about 35 mAh/g, about 21% of the total battery capacity. FIG. 15 shows the cycling performance of the battery out to 110 cycles. As shown in FIG. 15, the battery appears to maintain above 120 mAh/g capacity out to 110 cycles although a decrease of capacity was observed when the battery was cycled at high cycling rates between cycles 7 and 10. FIG. 16 shows the voltage performance of the battery out to 110 cycles. As shown in FIG. 16, the battery appears to maintain above 3 V out to 110 cycles although a decrease of voltage was observed when the battery was cycled at high cycling rates between cycles 7 and 10. FIGS. 17A and B shows the first cycle (A) and the second cycle (B) charge and discharge differential capacity of the battery between 4.6 V and 2.0V. The first cycle plots suggest two active phases during the first charge and three active phases during discharge. The second cycle charge plot shows significant changes relative to the first cycle, and the results suggest three active phases. The second cycle discharge plot is similar to the first cycle discharge plot. The second cycle contributions to the differential capacity near and below 3 V suggest clear contributions from a $Li_4Mn_5O_{12}$ spinel phase These batteries show relatively flat capacities and average voltages after under going roughly 25 cycles. These results suggest very good cycling stability with moderately high capacity that seems likely to extend to significantly larger cycle numbers.

Example 5

Materials with Formula
$Li_xCo_{0.25}Ni_{0.1875}Mn_{0.5625}O_{2+\delta}$

Figure 18:
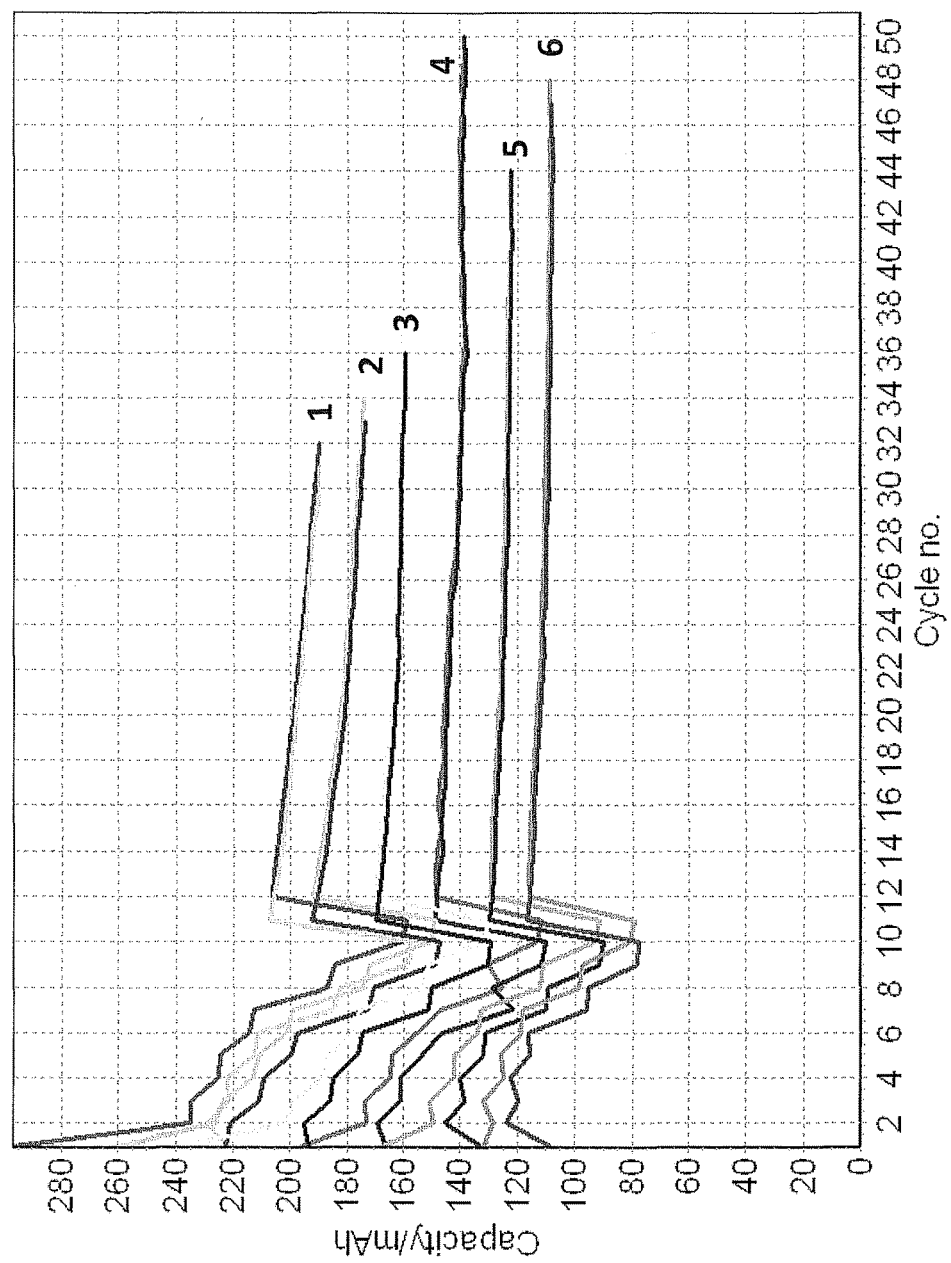
FIG. 18 is plot of capacity versus cycle number of the batteries 1-6 of example 5 cycled out to 50 cycles.
Figure 19:
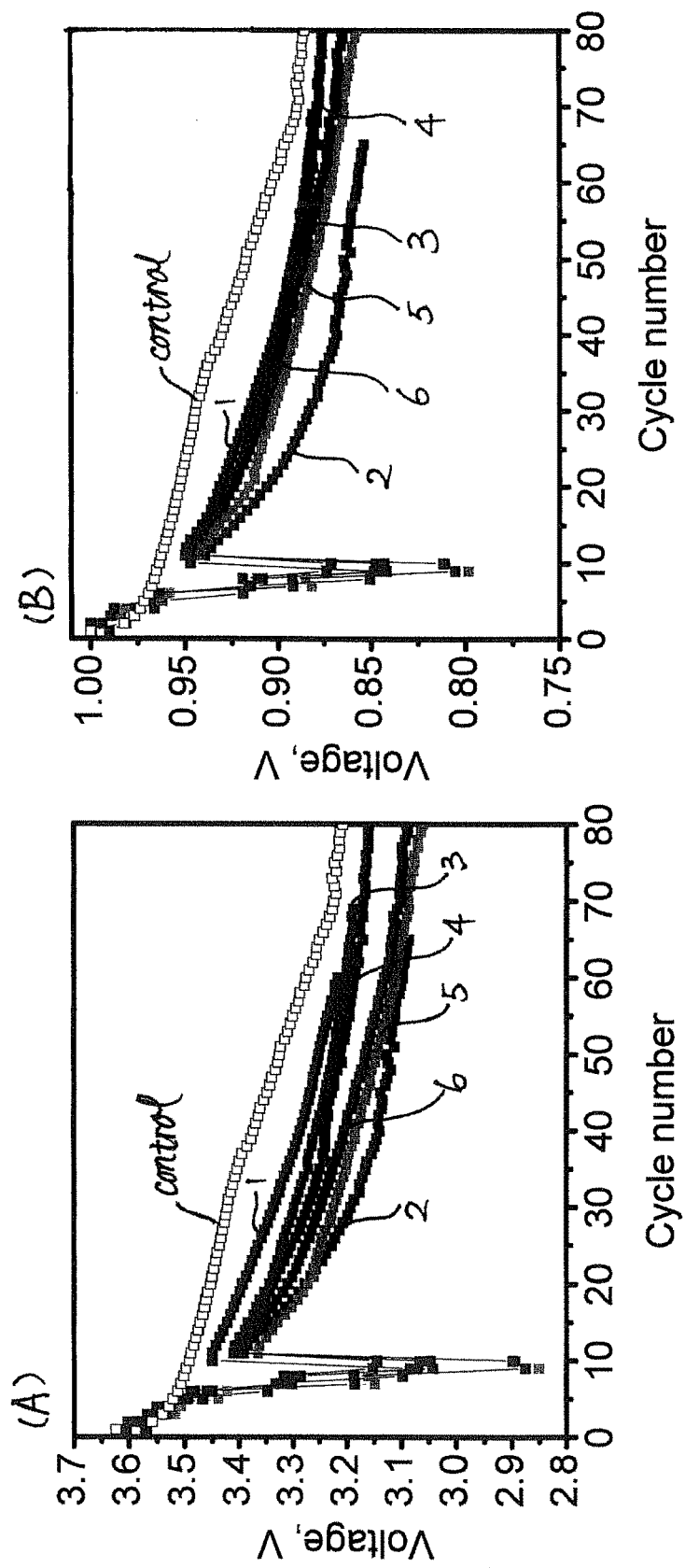
FIG. 19A is a plot of voltage versus cycle number of the batteries 1-6 of example 5 cycled out to 80 cycles.
FIG. 19B is plot of normalized average overall voltage versus cycle number of the batteries 1-6 of example 5 cycled out to 80 cycles.

Lithium metal oxide (LMO) active material with formula $Li_xCo_{0.25}Ni_{0.1875}Mn_{0.5625}O_{2+\delta}$, where x=1.5, 1.1875, 1.1, 1.0, 0.9, or 0.8 corresponding to samples 1, 2, 3, 4, 5, and 6, respectively, were formed using the method outlined above. The LMO samples 1-6 were then assembled into correspondingly numbered batteries with lithium foil negative electrode following the procedures outlined above. The batteries were cycled between 4.6 V to 2.0 V at C/10 for cycles 1 and 2, at C/5 for cycles 3 and 4, at C/3 for cycles 5 and 6, at 1C for cycles 7 and 8, at 2C for cycles 9 and 10, and at C/3 for subsequent cycles. FIG. 18 shows the cycling performance of the batteries out to 50 cycles. As shown in FIG. 18, battery 1 formed with the highest lithium to metal ratio x=1.5 appears to have the highest capacity throughout the measured cycles. The overall capacity of the batteries decrease with the decreased lithium to metal ratio in the LMO material with sample 6 having x=0.8 has the lowest overall capacity. The overall average voltage performances of the batteries were also evaluated using HCMR™ material as control and the results are shown in FIG. 19A. The normalized average overall voltage performances of the batteries are shown in FIG. 19B. All batteries 1-6 appear to have less average voltage compared to the HCMR™ control.

Batteries 1 and 3-6 appear to have similar normalized average voltage, while battery 2 appears to have lower overall average voltage compared to the other batteries.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. An electrochemically active material comprising a lithium metal oxide approximately represented by the formula $Li_{1+b}Co_mNi_nMn_pO_{(2)}$, where $-0.2 \leq b \leq 0.2$, $0.2 \leq m \leq 0.45$, $0.055 \leq n \leq 0.24$, $0.385 \leq p \leq 0.72$, and m+n+p is approximately 1, wherein up to about 5 mole percent of the transition metals is substituted with a metal dopant, the active material exhibiting three peaks during an initial charge in a differential capacity plot and being a multiphased single material having a layered crystal phase and a spinel crystal phase.

2. The electrochemically active material of claim 1 wherein $0 \leq b \leq 0.15$.

3. The electrochemically active material of claim 1 wherein $0.2 \leq m \leq 0.3$, $0.07 \leq n \leq 0.24$, $0.49 \leq p \leq 0.72$.

4. The electrochemically active material of claim 1 wherein $0.2 \leq m \leq 0.45$, $0.11 \leq n \leq 0.24$, $0.385 \leq p \leq 0.64$.

5. The electrochemically active material of claim 1 wherein $0.2 \leq m \leq 0.3$, $0.14 \leq n \leq 0.24$, $0.49 \leq p \leq 0.64$.

6. The electrochemically active material of claim 1 wherein the composition is approximately free of dopants.

7. The electrochemically active material of claim 1 wherein lithium metal oxide comprises a phase that is activated upon charging to 4.5V.

8. The electrochemically active material of claim 1 further comprising a stabilization coating.

9. The electrochemically active material of claim 8 wherein the stabilization coating comprises a metal oxide.

10. The electrochemically active material of claim 8 wherein the stabilization coating comprises a metal halide.

11. The electrochemically active material of claim 1 wherein the material has a specific discharge capacity at a 75th cycle that decreases by no more than about 10% relative to the specific capacity at the 25th cycle when cycled from a 25th cycle to 75th cycle at a rate of C/3 from 4.6V to 2V against lithium.

12. The electrochemically active material of claim 1 wherein the material has an average voltage at a 75th cycle that decreases by no more than about 10% relative to the average voltage at the 25th cycle when cycled from a 25th cycle to 75th cycle at a rate of C/3 from 4.6V to 2V against lithium.

13. A lithium based battery comprising a positive electrode comprising the electrochemically active material of claim 1, a negative electrode, a separator between the positive electrode and negative electrode and an electrolyte comprising lithium ions.

14. The lithium based battery of claim 13 wherein the negative electrode comprises an active material that intercalates or alloys with lithium.

15. The lithium based battery of claim 13 wherein the negative electrode comprises graphitic carbon.

16. The lithium based battery of claim 13 wherein the negative electrode comprises a silicon based composition.

17. The lithium based battery of claim 13 wherein the negative electrode comprises a lithium titanium oxide.

18. A method for synthesizing the electrochemically active material of claim 1, the method comprising precipitating a precursor composition comprising the desired transition metal ratios and heating the composition in an atmosphere comprising oxygen to form the lithium metal oxide.

19. The method of claim 18 wherein the heating comprises two heating steps involving two different temperatures.

20. A method for synthesizing the electrochemically active material of claim 1, the method comprising mixing solid precursor compositions comprising the transition metals in the mole ratio desired to form a precursor mixture and heating the mixture in an atmosphere comprising oxygen.

* * * * *